(12) United States Patent
Nakabayashi

(10) Patent No.: US 9,734,565 B2
(45) Date of Patent: Aug. 15, 2017

(54) IMAGE PROCESSING DEVICE AND METHOD FOR CORRECTING AN IMAGE ACCORDING TO A REVISED CORRECTION VALUE

(71) Applicant: Sony Corporation, Tokyo (JP)

(72) Inventor: Kiyotaka Nakabayashi, Saitama (JP)

(73) Assignee: SONY CORPORATION, Tokyo (JP)

( * ) Notice: Subject to any disclaimer, the term of this patent is extended or adjusted under 35 U.S.C. 154(b) by 233 days.

(21) Appl. No.: 14/451,135

(22) Filed: Aug. 4, 2014

(65) Prior Publication Data

US 2014/0341479 A1 Nov. 20, 2014

Related U.S. Application Data

(63) Continuation of application No. 11/749,436, filed on May 16, 2007, now abandoned.

(30) Foreign Application Priority Data

May 24, 2006 (JP) .................. 2006-143645

(51) Int. Cl.
*H04N 5/76* (2006.01)
*G06T 5/50* (2006.01)
(Continued)

(52) U.S. Cl.
CPC .................. *G06T 5/50* (2013.01); *H04N 1/46* (2013.01); *H04N 5/23216* (2013.01);
(Continued)

(58) Field of Classification Search
CPC ..................... H04N 1/46; H04N 5/23216
(Continued)

(56) References Cited

U.S. PATENT DOCUMENTS

| 2002/0054112 | A1* | 5/2002 | Hasegawa | ........... G06F 3/04845 715/764 |
| 2002/0131652 | A1 | 9/2002 | Yoda | |

(Continued)

FOREIGN PATENT DOCUMENTS

| JP | 2001-352459 | 12/2001 |
| JP | 2004-80549 | 3/2004 |

(Continued)

OTHER PUBLICATIONS

Japanese Office Action issued Sep. 8, 2011, in Patent Application No. 2006-143645.

*Primary Examiner* — Usman Khan
(74) *Attorney, Agent, or Firm* — Oblon, McClelland, Maier & Neustadt, L.L.P.

(57) ABSTRACT

An information processing system is disclosed. The system includes a first information processing device; and a second information processing device, the first information processing device transmitting data to the second information processing device in response to a request from the second information processing device. The first information processing device includes first storage means and transmission means. The second information processing device includes reception means, second storage means, display control means, revision parameter setting means, and image processing means.

25 Claims, 23 Drawing Sheets

(51) Int. Cl.
  *H04N 9/73*    (2006.01)
  *H04N 5/232*   (2006.01)
  *H04N 1/46*    (2006.01)

(52) U.S. Cl.
  CPC ..... *H04N 5/23229* (2013.01); *H04N 5/23293* (2013.01); *H04N 9/735* (2013.01)

(58) Field of Classification Search
  USPC .......................... 348/208.5, 231.3; 382/254
  See application file for complete search history.

(56) References Cited

U.S. PATENT DOCUMENTS

| | | | |
|---|---|---|---|
| 2003/0163833 A1 | 8/2003 | Chiba et al. | |
| 2005/0140803 A1 | 6/2005 | Ohtsuka et al. | |
| 2005/0152613 A1* | 7/2005 | Okutsu | G06T 5/00 382/254 |
| 2006/0056733 A1* | 3/2006 | Minakuti | H04N 5/765 382/286 |
| 2006/0164673 A1* | 7/2006 | Horii | H04N 1/407 358/1.13 |
| 2007/0046998 A1* | 3/2007 | Ohnishi | H04N 1/46 358/3.1 |
| 2007/0081740 A1* | 4/2007 | Ciudad | H04N 1/00286 382/276 |
| 2007/0092153 A1* | 4/2007 | Kagaya | H04N 1/622 382/254 |
| 2007/0206121 A1* | 9/2007 | Yoshida | G06F 3/14 348/630 |
| 2007/0216958 A1* | 9/2007 | Narukawa | H04N 1/00477 358/302 |

FOREIGN PATENT DOCUMENTS

| | | |
|---|---|---|
| JP | 2004-297520 | 10/2004 |
| JP | 2004-297698 | 10/2004 |
| JP | 2005-86641  | 3/2005  |
| JP | 2006-13889  | 1/2006  |

* cited by examiner

IMAGE PROCESSING DEVICE AND METHOD FOR CORRECTING AN IMAGE ACCORDING TO A REVISED CORRECTION VALUE

CROSS REFERENCES TO RELATED APPLICATIONS

This application is a continuation of U.S. application Ser. No. 11/749,436, filed May 16, 2007, which claims benefit of priority from Japanese Patent Application 2006-143645, filed May 24, 2006, the entire contents of which being incorporated herein in its entirety.

BACKGROUND OF THE INVENTION

1. Field of the Invention

The present invention relates to an information processing system, an information processing device, an information processing method, and a program and, more specifically, to an information processing system, an information processing device, an information processing method, and a program with which a user can easily acquire images of his or her desired color through a simple user operation in a digital camera, and others.

2. Description of the Related Art

FIG. 1 is a plan view of a digital camera of previous type, showing an exemplary configuration thereof.

That is, FIG. 1 is a plane view of a digital camera 31 viewed from the rear surface side, and the surface provided with a lens (not shown) is the front surface side of the digital camera 31. In FIG. 1, the digital camera 31 is provided with an operation section 41 and a display section 42.

The operation section 41 is configured by a cross key, an enter button, or a cancel button, for example, and is operated by a user. The display section 42 is a liquid crystal panel, for example, and displays thereon images captured by the digital camera 31, and a setting screen for use for various types of settings.

With the digital camera 31 configured as such, an initial setting is made for various types of settings when the user turns on the digital camera 31 for the first time, for example. The initial setting can be also made when the user operates the operation section 41.

With the initial setting, for example, the time of a clock can be set.

That is, FIG. 2 is a flowchart for illustrating the process of initial setting of the digital camera 31.

In step S31, as shown in FIG. 1, for example, the digital camera 31 displays a setting screen on the display section 42 for initial setting of time of a clock. The procedure then goes to step S32.

In step S32, when a user sets the time of the clock through operation of the operation section 41, the digital camera 31 stores the setting. This is the end of the process of initial setting.

The applicant of the invention has disclosed the image processing technology for correcting the color of an image captured by a digital camera or others to the color estimated as quite matching the user preferences. As an example, refer to Patent Document 1 (JP-A-2004-297520), Patent Document 2 (JP-A-2004-297698), and Patent Document 3 (JP-A-2005-86641). With such an image processing technology, the image captured by a digital camera is corrected to be in a previously estimated given stored color (or a color close to the stored color).

SUMMARY OF THE INVENTION

The issue here is that the preferences for the color of the image vary among users, and thus the image corrected to be in the given (fixed) stored color is not always the image of a color desired by the users.

Another issue is that, with the digital camera of previous type, the time of a clock can be set in the initial setting as with the digital camera 31, however, it has been difficult to meet the user preferences through control exercise over white balance, color reproduction, intensity, and others.

It is thus desirable to provide an information processing system, an information processing device, an information processing method, and a program with which a user can easily acquire images of his or her desired color through a simple user operation.

According to a first embodiment of the present invention, there is provided an information processing system including a first information processing device and a second information processing device, the first information processing device transmitting data to the second information processing device in response to a request from the second information processing device. In the system, the first information processing device includes: first storage means for storing therein data being a correlation result among a plurality of parameters for use to revise a standard value of a correction value for image correction, and a plurality of images each corrected by a revised correction value being the correction value as a result of revising the standard value by each of the parameters; and transmission means for transmitting the data stored in the first storage means. The second information processing device includes: reception means for receiving the data; second storage means for storing therein the data received by the reception means; display control means for making display means for image display to display the images found in the data stored in the second storage means; revision parameter setting means for setting, when any one of the images displayed on the display means is selected, as a revision parameter, any of the parameters correlated with the image selected through a user operation of operation means; and image processing means for performing image correction using the revised correction value as a result of revising the standard value by the revision parameter.

In the first embodiment of the invention, in the first information processing device, transmitted is data being a correlation result among a plurality of parameters for use to revise a standard value of a correction value for image correction, and a plurality of images each corrected by a revised correction value being the correction value as a result of revising the standard value by each of the parameters. In the second information processing device, the reception means receives the data, and the second storage means stores therein the data received by the reception means. Thereafter, by the display control means, the images found in the data stored in the second storage means are displayed on the display means for image display. When any one of the images displayed on the display means is selected, by the revision parameter setting means, any of the parameters correlated with the image selected through a user operation of the operation means is set as a revision parameter. The image processing means then performs image correction using the revised correction value as a result of revising the standard value by the revision parameter.

According to a second embodiment of the present invention, there is provided an information processing device for performing image correction, including: storage means for storing therein data being a correlation result among a plurality of parameters for use to revise a standard value of a correction value for image correction, and a plurality of images each corrected by a revised correction value being the correction value as a result of revising the standard value by each of the parameters; display control means for making display means for image display to display the images found in the data stored in the storage means; revision parameter setting means for setting, when any one of the images displayed on the display means is selected, as a revision parameter, any of the parameters correlated with the image selected through a user operation of operation means; and image processing means for performing image correction using the revised correction value as a result of revising the standard value by the revision parameter.

The image processing means can perform the image correction using the revised correction value as a result of adding together the standard value and the revision parameter.

The image processing means can perform the image correction using at least any one of white balance correction, color reproduction correction, and intensity correction.

The information processing device of the second embodiment can be further provided with reception means for receiving the data, and the storage means can store therein the data received by the reception means.

The information processing device of the second embodiment can be further provided with imaging means for capturing an image, and the image processing means can correct the image captured by the imaging means.

According to the second embodiment of the present invention, there is also provided an information processing method for use by an image processing device that performs image correction, or a program for use with a computer to perform information processing for image correction. The method or the program includes the steps of: making display means for image display to display a plurality of images found in data being a correlation result among a plurality of parameters for use to revise a standard value of a correction value for image correction, and the plurality of images each corrected by a revised correction value being the correction value as a result of revising the standard value by each of the parameters; setting, when any one of the images displayed on the display means is selected, as a revision parameter, any of the parameters correlated with the image selected through a user operation of operation means; and performing image correction using the revised correction value as a result of revising the standard value by the revision parameter.

In the second embodiment of the invention, on the display means for image display, displayed are a plurality of images found in data being a correlation result among a plurality of parameters for use to revise a standard value of a correction value for image correction, and the plurality of images each corrected by a revised correction value being the correction value as a result of revising the standard value by each of the parameters. When any one of the images displayed on the display means is selected, any of the parameters correlated with the image selected through a user operation of the operation means is set as a revision parameter. Using the revised correction value as a result of revising the standard value by the revision parameter, image correction is performed.

According to the embodiments of the invention, a user can easily acquire images of his or her desired color through a simple user operation, for example.

DETAILED DESCRIPTION OF THE INVENTION

Figure 1:
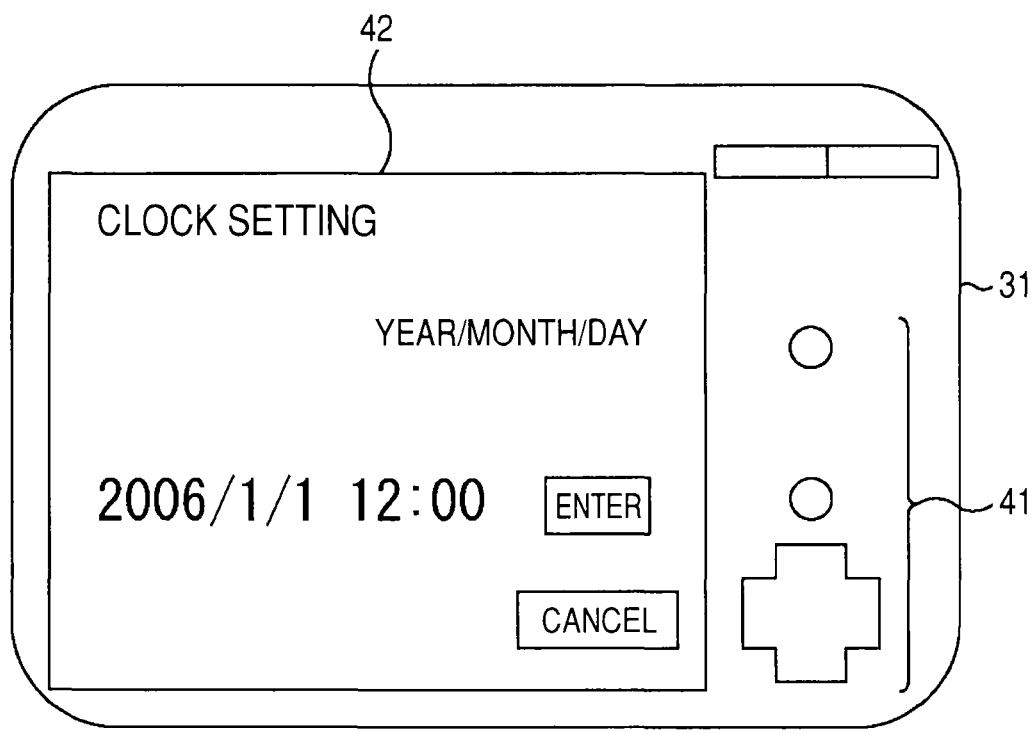
FIG. 1 is a diagram showing a screen for initial setting in a digital camera of previous type.
Figure 2:
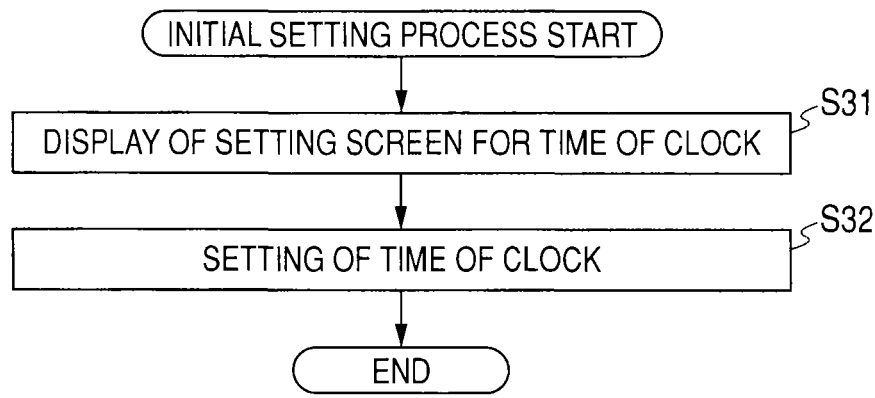
FIG. 2 is a flowchart for illustrating a process of initial setting in the previous digital camera.

Prior to describing an embodiment of the invention below, exemplified is a correlation among constituents of the invention and an embodiment in this specification or in the accompanying drawings. This is aimed to prove that embodiments provided for the purpose of supporting the invention are described in the specification or in the accompanying drawings. Therefore, even if there is any specific embodiment found in the specification or in the accompanying drawings but not described here as the embodiment corresponding to the constituents of the invention, it does not mean that the embodiment is not correlated with the constituents. On the other hand, even if there is any specific embodiment described here as corresponding to the constituents, it does not mean that the embodiment is only correlated with the constituents.

According to a first embodiment of the present invention, there is provided an information processing system (e.g., data update processing system 341 of FIG. 23) in which a first information processing device transmits data to a second information processing device in response to a request coming therefrom. In the system, the first information processing device (e.g., server 351 of FIG. 23) includes: first storage means (e.g., storage section 381 of FIG. 23) for storing therein data being a correlation result among a plurality of parameters for use to revise a standard value of a correction value for image correction, and a plurality of images each corrected by a revised correction value being the correction value as a result of revising the standard value by each of the parameters; and transmission means (e.g., transmission section 382 of FIG. 23) for transmitting the data stored in the first storage means. The second information processing device (e.g., digital camera 81 of FIG. 23) includes: reception means (e.g., reception section 151 of FIG. 3) for receiving the data; second storage means (e.g., table storage section 132 of FIG. 3) for storing therein the data received by the reception means; display control means (e.g., display control section 125 of FIG. 3) for making display means (e.g., display section 126 of FIG. 3) for image display to display the images found in the data stored in the second storage means; revision parameter setting means (e.g., revision parameter setting section 201 of FIG. 5) for setting, when any one of the images displayed on the display means is selected, as a revision parameter, any of the parameters correlated with the image selected through a user operation of operation means (e.g., operation section 127 of FIG. 3); and image processing means (e.g., image processing section 123 of FIG. 3) for performing image correction using the revised correction value as a result of revising the standard value by the revision parameter.

According to a second embodiment of the present invention, there is provided an information processing device (e.g., digital camera 81 of FIG. 3) for performing image correction, including: storage means (e.g., table storage section 132 of FIG. 3) for storing therein data being a correlation result among a plurality of parameters for use to revise a standard value of a correction value for image correction, and a plurality of images corrected by a revised correction value being the correction value as a result of revising the standard value by each of the parameters; display control means (e.g., display control section 125 of FIG. 3) for making display means (e.g., display section 126 of FIG. 3) for image display to display the images found in the data stored in the storage means; revision parameter setting means (e.g., revision parameter setting section 201 of FIG. 5) for setting, when any one of the images displayed on the display means is selected, as a revision parameter, any of the parameters correlated with the image selected through a user operation of operation means (e.g., operation section 127 of FIG. 3); and image processing means (e.g., image processing section 123 of FIG. 3) for performing image correction using the revised correction value as a result of revising the standard value by the revision parameter.

The information processing device of the second embodiment can be further provided with reception means (e.g., reception section 151 of FIG. 3) for receiving the data, and the storage means can store therein the data received by the reception means.

The information processing device of the second embodiment can be further provided with imaging means (e.g., imaging section 121 of FIG. 3) for capturing an image, and the image processing means can correct the image captured by the imaging means.

According to the second embodiment of the present invention, there is also provided an information processing method for use by an image processing device that performs image correction, or a program for use with a computer to perform information processing for image correction. The method or the program includes the steps of: making display means for image display to display a plurality of images found in data being a correlation result among a plurality of parameters for use to revise a standard value of a correction value for image correction, and the plurality of images each corrected by a revised correction value being the correction value as a result of revising the standard value by each of the parameters (e.g., steps S73, S75, S77, and S79 of FIG. 13); setting, when any one of the images displayed on the display means is selected, as a revision parameter, any of the parameters correlated with the image selected through a user operation of operation means (e.g., steps S74, S76, S78, and S80 of FIG. 13); and performing image correction using the revised correction value as a result of revising the standard value by the revision parameter (e.g., steps S112 and S116 of FIG. 4).

In the below, by referring to the accompanying drawings, an embodiment of the invention is described.

Figure 3:
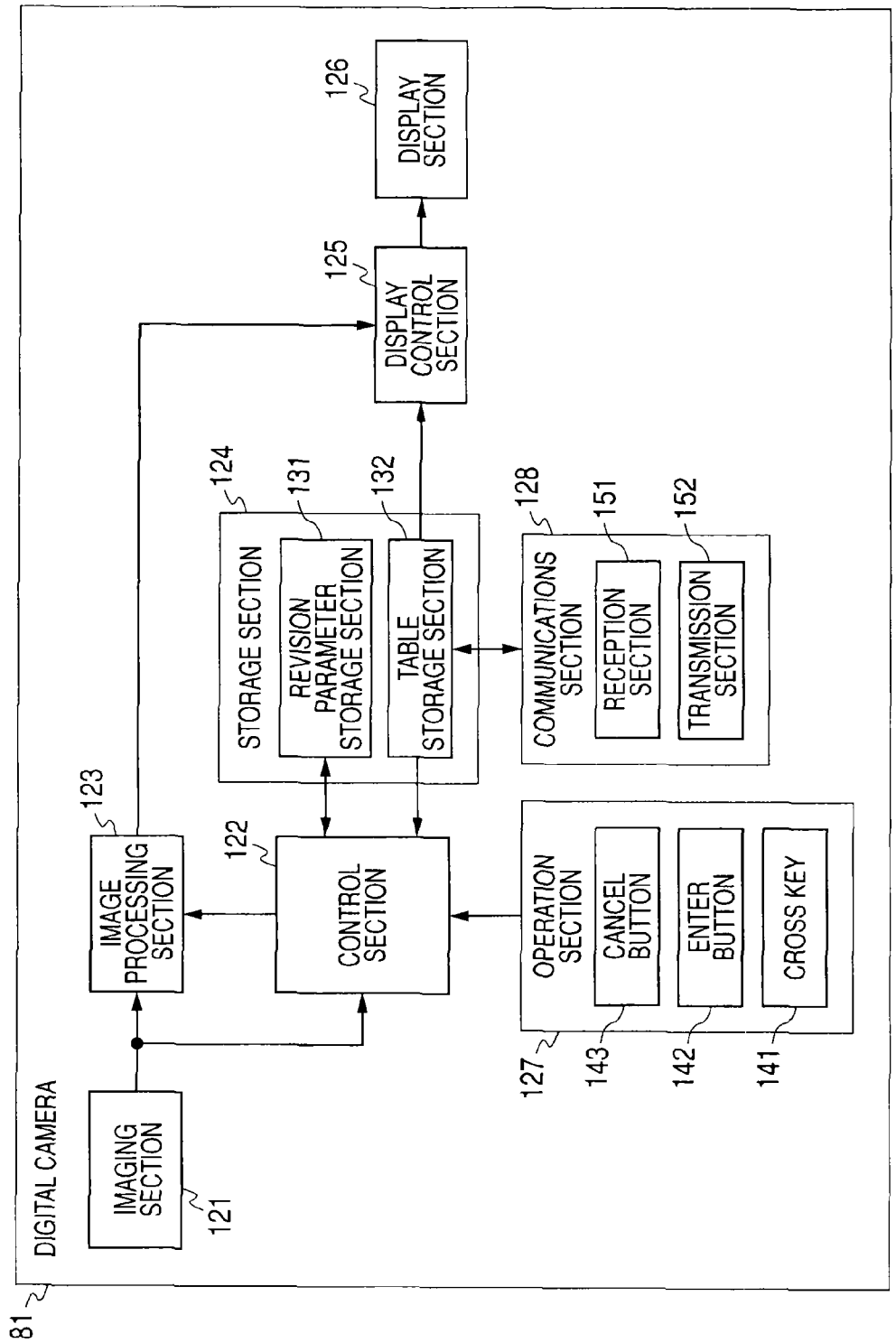
FIG. 3 is a block diagram showing an exemplary configuration of an embodiment of a digital camera to which the invention is applied.

FIG. 3 is a block diagram showing an exemplary configuration of an embodiment of a digital camera (digital still camera) 81 to which the invention is applied.

The digital camera 81 is configured to include: an imaging section 121, a control section 122, an image processing section 123, a storage section 124, a display control section 125, a display section 126, an operation section 127, and a communications section 128.

The imaging section 121 captures the image of an object, and supplies the resulting captured image to the control section 122 and the image processing section 123.

The digital camera 81 has shooting modes of auto shooting and manual shooting, for example, in accordance with the type of an object. With the auto shooting mode, the digital camera 81 takes charge of, automatically, various types of settings such as focusing, white balance, and color correction. With the manual shooting mode, a user makes various types of settings. In the below, exemplified is a case with the auto shooting mode.

The control section 122 goes through various types of processes in response to an operation signal coming from the operation section 127 operated by a user. Specifically, for example, in response to an operation signal coming from the operation section 127, the control section 122 reads, as a revision parameter, any of parameters stored in a table storage section 132 that will be described later. Thus read parameter is supplied to a revision parameter storage section 131 (will be described later) for storage therein.

Based on the captured image provided by the imaging section 121, the control section 122 determines a color temperature of the object in the captured image. Based on the determined color temperature, the control section 122 calculates a standard value of a correction value for use for image processing of correcting the captured image.

The control section 122 also reads the revision parameter from the revision parameter storage section 131 for provision to the image processing section 123 together with the standard value of the correction value.

Herein, the standard value of the correction value is a correction value automatically determined by the digital camera 81 using the image captured by the imaging section 121. The standard value is used for image processing of correcting the captured image to be in a given storage color, which is estimated as quite matching the user preferences.

The image processing section 123 revises, using the revision parameter provided by the control section 122, the standard value provided also by the control section 122. Using the revised correction value being a result of revising the standard value by the revision parameter, the image processing section 123 goes through image processing of correcting the captured image provided by the imaging section 121. The resulting captured image through with such correction is forwarded to the display control section 125.

The components, i.e., the imaging section 121, the control section 122, and the image processing section 123, will be described in detail later by referring to FIGS. 4, 5, and 6 (15).

The storage section 124 is configured to include the revision parameter storage section 131 and the table storage section 132. The revision parameter storage section 131 stores therein a revision parameter provided by the control section 122.

The table storage section 132 stores therein data being a correlation result among a plurality of parameters for use to each revise a standard value of a correction value for image correction, and a plurality of images each corrected by a revised correction value being the correction value as a result of revising the standard value by each of the parameters.

To be specific, the table storage section 132 stores therein a plurality of sets each of an image corrected by a revised correction value and a parameter used for revising the standard value to derive the revised correction value. The images corrected by a revised correction value include white images, skin-color images, blue images, green images, and others.

The white image is of white-based, and the skin-color image is of skin-color-based. The blue image is of blue-based, and the green image is of green-based.

The sets stored in the table storage section 132, each of an image corrected by a revised correction value and a parameter, are referred to as revision data as appropriate.

The parameter found in the revision data is to be a potential revision parameter for storage in the revision parameter storage section 131, and thus is hereinafter referred to as potential parameter as appropriate.

The display control section 125 supplies, to the display section 126 for display, the captured image provided by the image processing section 123 after correction. The display control section 125 also reads, from the table storage section 132, the images found in the revision data, and supplies the images to the display section 126 for display thereon.

Being under the control of the display control section 125, the display section 126 displays thereon images and others provided by the display control section 125. The display section 126 is exemplified by an LCD (Liquid Crystal Display).

The operation section 127 is configured to include a cross key 141, an enter button 142, a cancel button 143, and others, and is operated by a user. The operation section 127 supplies an operation signal responding to the user operation to the control section 122.

The communications section 128 is configured to include a reception section 151 and a transmission section 152, and performs communications with any external devices.

That is, the reception section 151 receives revision data coming over a network such as the Internet or LAN (Local Area Network), and forwards the data to the table storage section 132 for storage therein.

The transmission section 152 reads the revision data from the table storage section 132, and forwards the data to any other digital cameras or others over a network.

Figure 4:
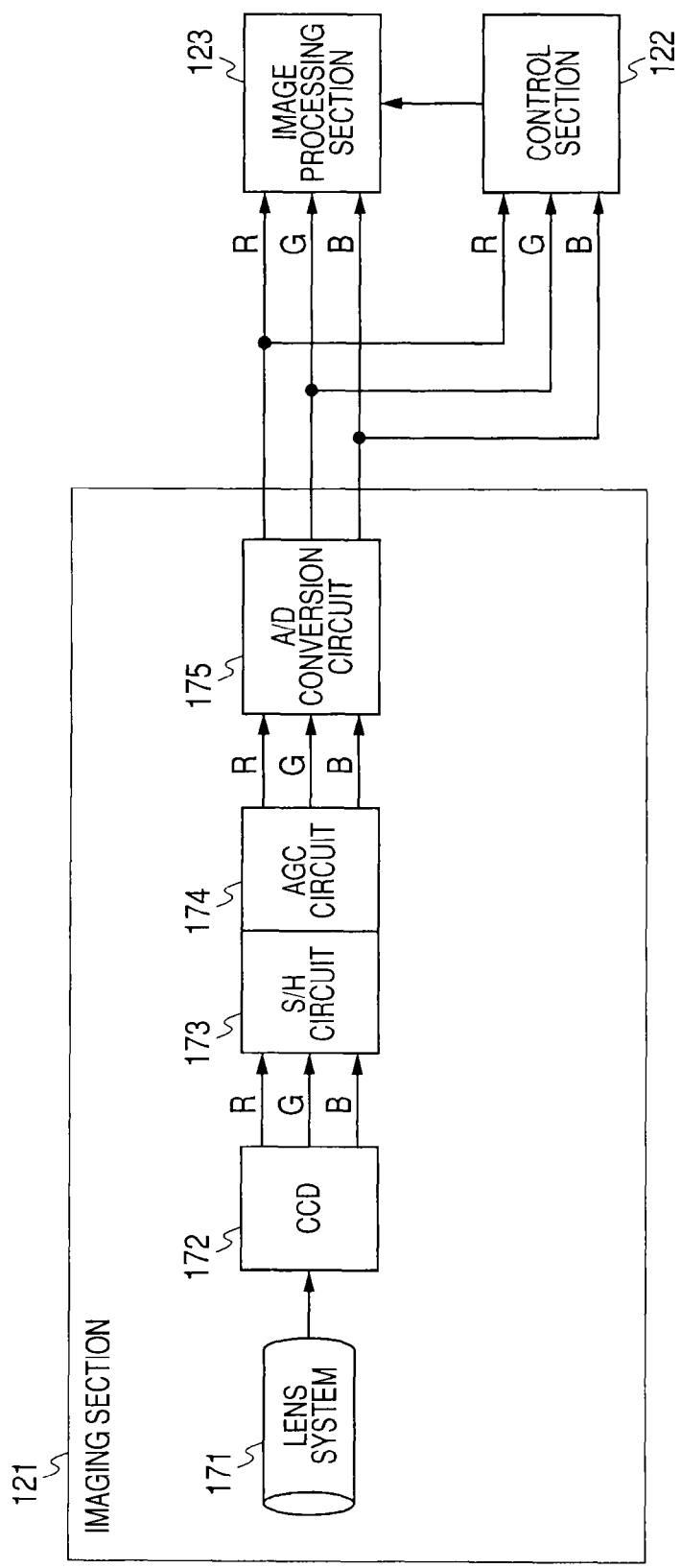
FIG. 4 is a block diagram showing an exemplary detailed configuration of an imaging section of FIG. 3.

FIG. 4 is a block diagram showing an exemplary detailed configuration of the imaging section 121 of FIG. 3.

The imaging section 121 is configured to include a lens system 171, a CCD (Charge Coupled Device) 172, an S/H (Sample/Hold) circuit 173, an AGC (Automatic Gain Control) circuit 174, and an A/D (Analog/Digital) conversion circuit 175.

The lens system 171 is configured by a shutter, a lens stop, a condenser, and others, and a light entering thereinto is directed to the CCD 172 so that the image of an object is formed on the light reception surface of the CCD 172. The CCD 172 applies photoelectric conversion to the image (light) of the object formed on the light reception surface, thereby deriving analog image signals of R, G, and B (Red, Green, and Blue). These signals are forwarded to the S/H circuit 173. Note here that the CCD 172 is exemplified as being an imaging device, but this is surely not restrictive. As an alternative to the CCD 172, a CMOS (Complementary Metal Oxide Semiconductor) sensor is also a possible option for an imaging device, for example.

The S/H circuit 173 applies correlated double sampling to the analog image signals R, G, and B provided by the CCD 172, for example, and forwards the conversion results to the AGC circuit 174.

The AGC circuit 174 performs gain adjustment to the conversion results, i.e., the analog image signals R, G, and B, provided by the S/H circuit 173, and supplies the adjustment results to the A/D conversion circuit 175.

The A/D conversion circuit 175 applies A/D conversion to the adjustment results, i.e., the analog image signals R, G, and B, provided by the AGC circuit 174, and forwards, as captured images, the resulting digital image signals R, G, and B to the control section 122 and the image processing section 123 of FIG. 3.

Figure 5:
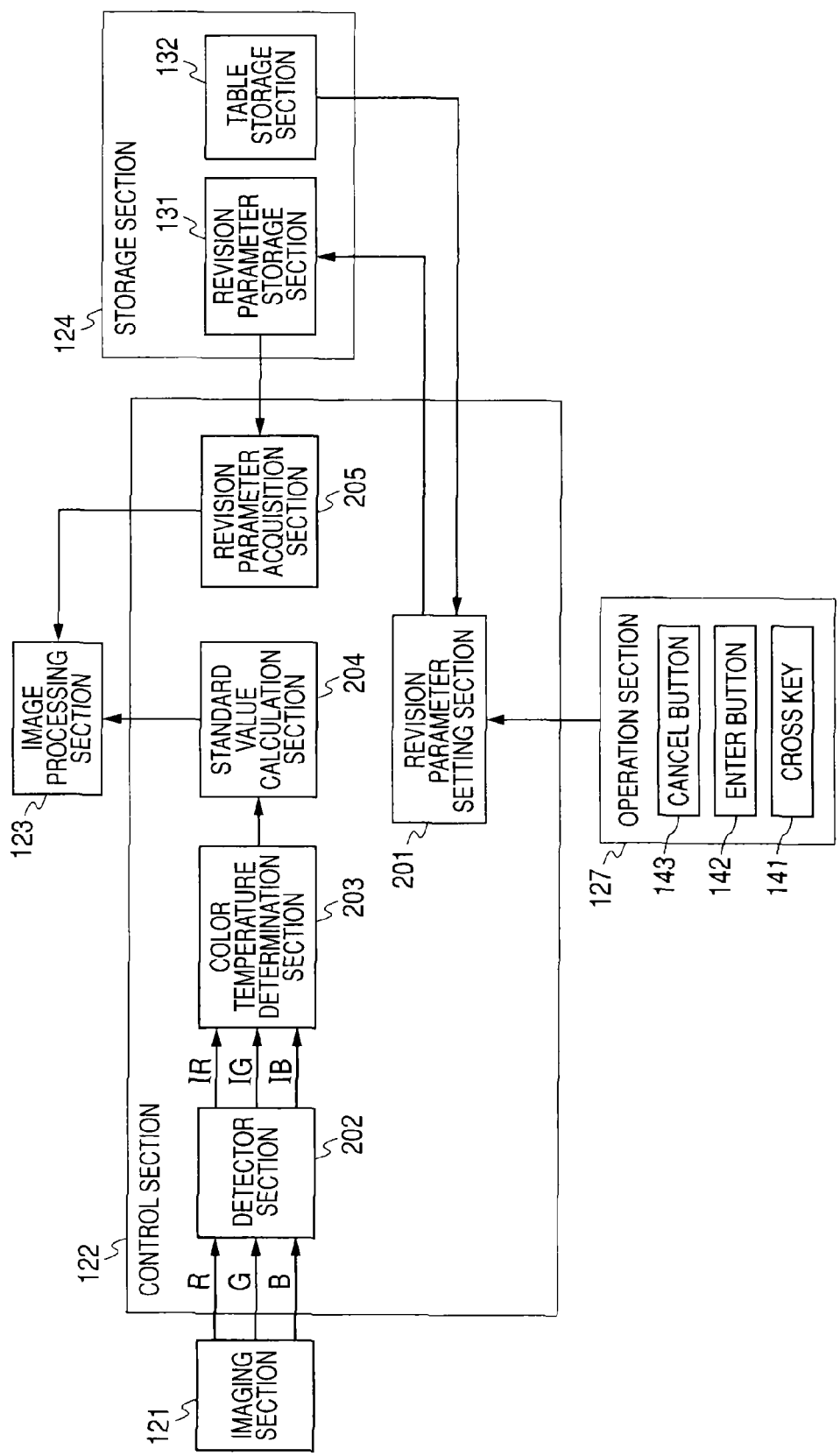
FIG. 5 is a block diagram showing an exemplary detailed configuration of a control section of FIG. 3.

FIG. 5 is a block diagram showing an exemplary detailed configuration of the control section 122 of FIG. 3.

The control section 122 is configured to include: a revision parameter setting section 201, a detector section 202, a color temperature determination section 203, a standard value calculation section 204, and a revision parameter acquisition section 205.

The revision parameter setting section 201 reads, based on an operation signal provided by the operation section 127 of FIG. 3, any of potential parameters included in the revision data stored in the table storage section 132 of FIG. 3. Thus read parameter is supplied to the revision parameter storage section 131 as a revision parameter for storage therein. As such, to the revision parameter storage section 131, a revision parameter is set.

The detector section 202 applies detection to the digital image signals R, G, and B, i.e., the captured images, provided by the imaging section 121, and the resulting detector signals IR, IG, and IB are forwarded to the color temperature determination section 203.

The color temperature determination section 203 determines, based on the detector signals IR, IG, and IB provided by the detector section 202, the color temperature of an object in the captured images being the digital image signals R, G, and B. The determination result is forwarded to the standard value calculation section 204.

The standard value calculation section 204 calculates, based on the color temperature provided by the color temperature determination section 203, a WB standard value and a color-correction matrix standard value for supply to the image processing section 123. The WB standard value is a standard value for use for WB (White Balance) correction, and the color-correction matrix standard value is a standard value for use for color correction of correcting a color-difference signal.

Herein, the WB standard value is of correcting the color of the object, e.g., from the white color being not achromatic (reddish or bluish) to the white color of achromatic. Such color correction is made by, on a ratio plane with the lateral axis of B/G and the vertical axis of R/G, moving the coordinates (B/G, R/G) correlated with the not-achromatic white color of the object along a black body radiation curve.

The color-correction matrix standard value is of correcting (reproducing) the color of the object to a given storage color estimated as quite matching the user preferences.

The WB correction using a WB standard value can be performed in accordance with Equations (1) and (2) below, for example.

$$g_r \cdot R_0/G = R_1/G \quad (1)$$

$$g_b \cdot B_0/G = B_1/G \quad (2)$$

In Equations (1) and (2), G denotes a G signal of a captured image whose value remains the same before and after the WB correction, $R_0$ and $B_0$ denote, respectively, R and B signals of the captured image before the WB correction, and $R_1$ and $B_1$ denote, respectively, R and G signals of the captured image after the WB correction. Moreover, $g_r$ and $g_b$ each denote a WB standard value.

The coordinates ($B_1/G$, $R_1/G$) are those after the coordinates ($B_0/G$, $R_0/G$) are moved by a WB standard value ($g_r$, $g_b$) along the black body radiation curve in a predetermined direction, i.e., the coordinates correlated with the not-achromatic white color.

The color correction using a color-correction matrix standard value can be performed in accordance with Equation (3) below, for example.

$$\begin{bmatrix} (B-Y)' \\ (R-Y)' \end{bmatrix} = \begin{bmatrix} GainB & HueR \\ HueB & GainR \end{bmatrix} \cdot \begin{bmatrix} (B-Y) \\ (R-Y) \end{bmatrix} \quad (3)$$

In Equation (3), the components of a matrix with 2 rows and 2 columns on the right side, i.e., GainB, HueR, HueB, and GainR, each denote a color-correction matrix standard value. Also in Equation (3), (B−Y) and (R−Y) each denote a color-difference signal of the captured image before the color correction, and (B−Y)' and (R−Y)' each denote a color-difference signal of the captured image after the color correction.

The revision parameter acquisition section 205 reads, from the revision parameter storage section 131, a revision parameter for supply to the image processing section 123. The revision parameter here is used for revising a WB standard value, a color-correction matrix standard value, and others, which are calculated by the standard value calculation section 204.

Figure 6:
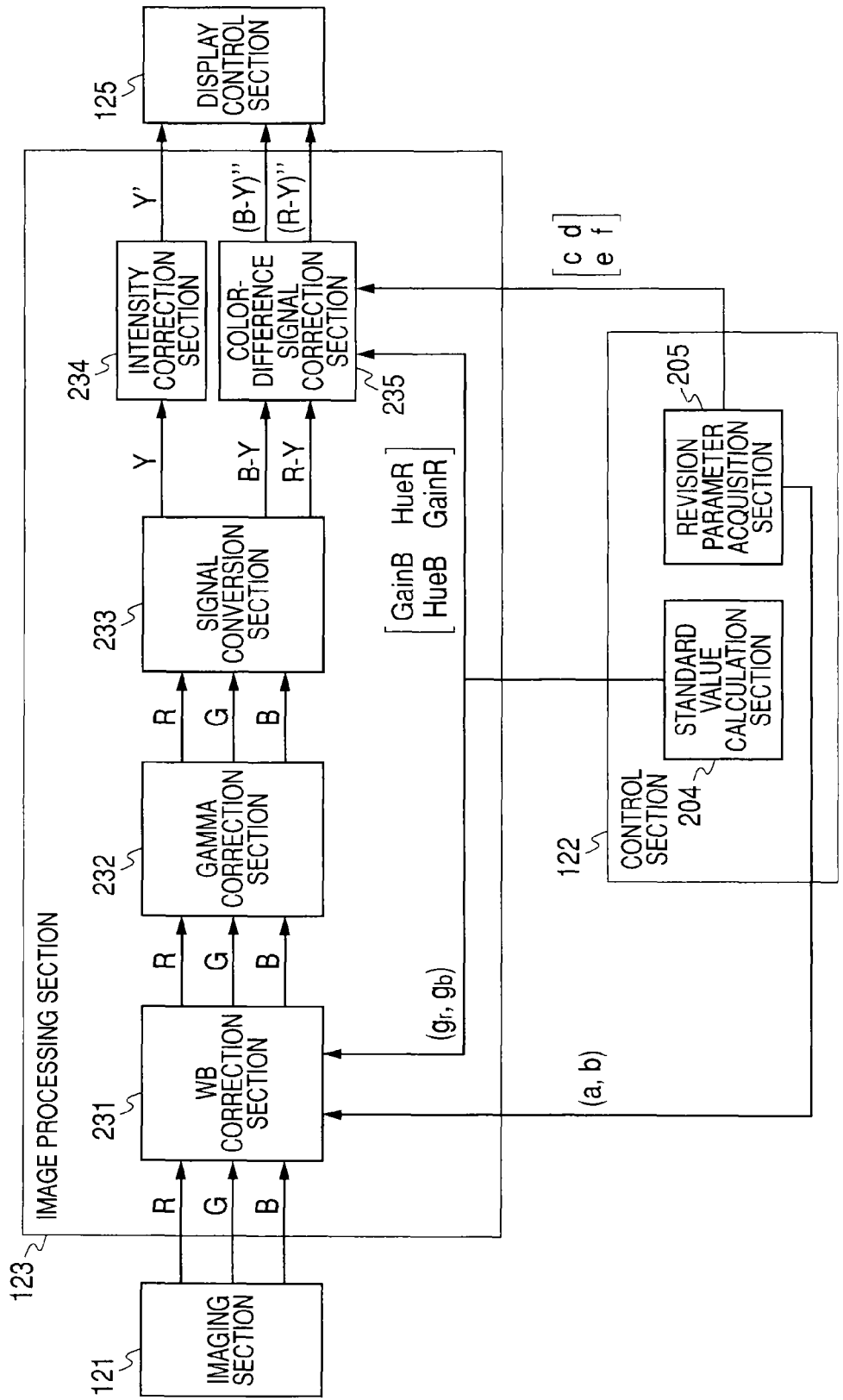
FIG. 6 is a block diagram showing an exemplary detailed configuration of an image processing section of FIG. 3.

FIG. 6 is a block diagram showing an exemplary detailed configuration of the image processing section 123 of FIG. 3.

The image processing section 123 is configured to include: a WB correction section 231, a gamma correction section 232, a signal conversion section 233, an intensity correction section 234, and a color-difference signal correction section 235.

The WB correction section 231 revises a WB standard value ($g_r$, $g_b$) provided by the standard value calculation section 204 of FIG. 5 by adding, thereto, a WB revision value (a, b) of any one of revision parameters provided by the revision parameter acquisition section 205 of FIG. 5 for revising the WB standard value ($g_r$, $g_b$). Using the resulting WB revised correction value ($g_r$+a, $g_b$+b), the WB correction is performed to a captured image coming from the imaging section 121.

That is, the WB correction section 231 computes Equations (4) and (5) below so that the WB correction is performed to the digital image signals R, G, and B provided by the imaging section 121. After the WB correction, the resulting digital image signals R, G, and B are forwarded to the gamma correction section 232.

$$(g_r+a) \cdot R_0/G = R_1/G \quad (4)$$

$$(g_b+b) \cdot B_0/G = B_1/G \quad (5)$$

The gamma correction section 232 performs gamma correction of correcting the gray scale of the digital image signals R, G, and B provided by the WB correction section 231, and the gamma-corrected digital image signals R, G, and B are forwarded to the signal conversion section 233.

The signal conversion section 233 converts the digital image signals (color signals) R, G, and B provided by the gamma correction section 232 into an intensity signal Y, and color-difference signals (B−Y) and (R−Y). The intensity signal Y is an addition result of the values of the digital image signals R, G, and B after weighing each of those by a predetermined value.

The signal conversion section 233 also determines a color (correlated color) correlated with the coordinates (B−Y, R–Y) defined by the color-difference signals (B–Y) and (R–Y). Such a color determination is made by using a color-difference plane with the lateral axis of the color-difference signal (B–Y), and the vertical axis of the color-difference signal (R–Y).

The signal conversion section 233 includes a table indicating a correlation between the areas on the color-difference plane and colors. With reference to the table, a determination is made what color is correlated with the coordinates (B–Y, R–Y) depending on the location of the coordinates (B–Y, R–Y) on the color-difference plane.

The signal conversion section 233 supplies the intensity signal Y to the intensity correction section 234, and the color correlated with the coordinates (B–Y, R–Y) and the color-difference signals (B–Y) and (R–Y) to the color-difference signal correction section 235.

The intensity correction section 234 applies intensity correction to the intensity signal Y provided by the signal conversion section 233, and supplies the resulting corrected intensity signal Y' to the display control section 125.

The color-difference signal correction section 235 applies color correction, i.e., color reproduction correction, to the color-difference signals (B–Y) and (R–Y) provided by the signal conversion section 233.

That is, based on the correlated color provided by the signal conversion section 233, the color-difference signal correction section 235 selects anyone of the color-correction matrix revision values being revision parameters provided by the revision parameter acquisition section 205 specifically for use to revise the color-correction matrix standard value.

Herein, the color-correction matrix revision values being the revision parameters provided by the revision parameter acquisition section 205 to the color-difference signal correction section 235 include those correlated with each of the images, e.g., skin-color images, blue images, or green images. When the correlated color is skin-color, blue, or green, the color-difference signal correction section 235 selects the color-correction matrix revision value correlated with the image of the color, i.e., skin-color image, blue image, or green image.

When the correlated color is not blue, skin-color, or green, the color signal correction section 235 sets the color-correction matrix revision value to 0, for example.

The color-difference signal correction section 235 revises the color-correction matrix standard value provided by the standard value calculation section 204 by adding, thereto, the color-correction matrix revision value selected from those others provided by the revision parameter acquisition section 205. Using the resulting color-correction matrix revised correction value, the color-difference signal correction section 235 applies color correction to the color-difference signals (B–Y) and (R–Y) provided by the signal conversion section 233.

To be specific, the color-difference signal correction section 235 performs color correction of correcting the color-difference signals (B–Y) and (R–Y) to the color-difference signals (B–Y)" and (R–Y)" through a computation of Equation (6) below.

$$\begin{bmatrix}(B-Y)''\\(R-Y)''\end{bmatrix}=\left(\begin{bmatrix}GainB & HueR\\HueB & GainR\end{bmatrix}+\begin{bmatrix}c & d\\e & f\end{bmatrix}\right)\cdot\begin{bmatrix}(B-Y)\\(R-Y)\end{bmatrix} \quad (6)$$

In Equation (6), the components of a matrix with 2 rows and 2 columns on the right side, i.e., c, d, e, and f, each denote a color-correction matrix revision value selected by the color-difference signal correction section 235. The components of another matrix with 2 rows and 2 columns, i.e., GainB, HueR, HueB, and GainR, each denote a color-correction matrix standard value as described above. Accordingly, the sum components of the two matrixes each with 2 rows and 2 columns on the right side in Equation (6), i.e., GainB+c, HueR+d, HueB+e, and GainR+f, each denote a color-correction matrix revised correction value.

In the below, the matrix with 2 rows and 2 columns configured by the components c, d, e, and f is referred to as color-correction matrix revision value [c, d, e, f] as appropriate, and the matrix with 2 rows and 2 columns configured by the components GainB, HueR, HueB, and GainR is referred to as color-correction matrix standard value [GainB, HueR, HueB, GainR] as appropriate. The matrix with 2 rows and 2 columns configured by the components GainB+c, HueR+d, HueB+e, and GainR+f is referred to as color-correction matrix revised correction value [GainB+c, HueR+d, HueB+e, GainR+f] as appropriate.

Thereafter, the color-difference signal correction section 235 supplies, to the display control section 125, the color-difference signals (B–Y)" and (R–Y)" being the results of the color correction.

By referring to FIG. 7, described next is the revision data stored in the table storage section 132 of FIG. 3.

Figure 7:
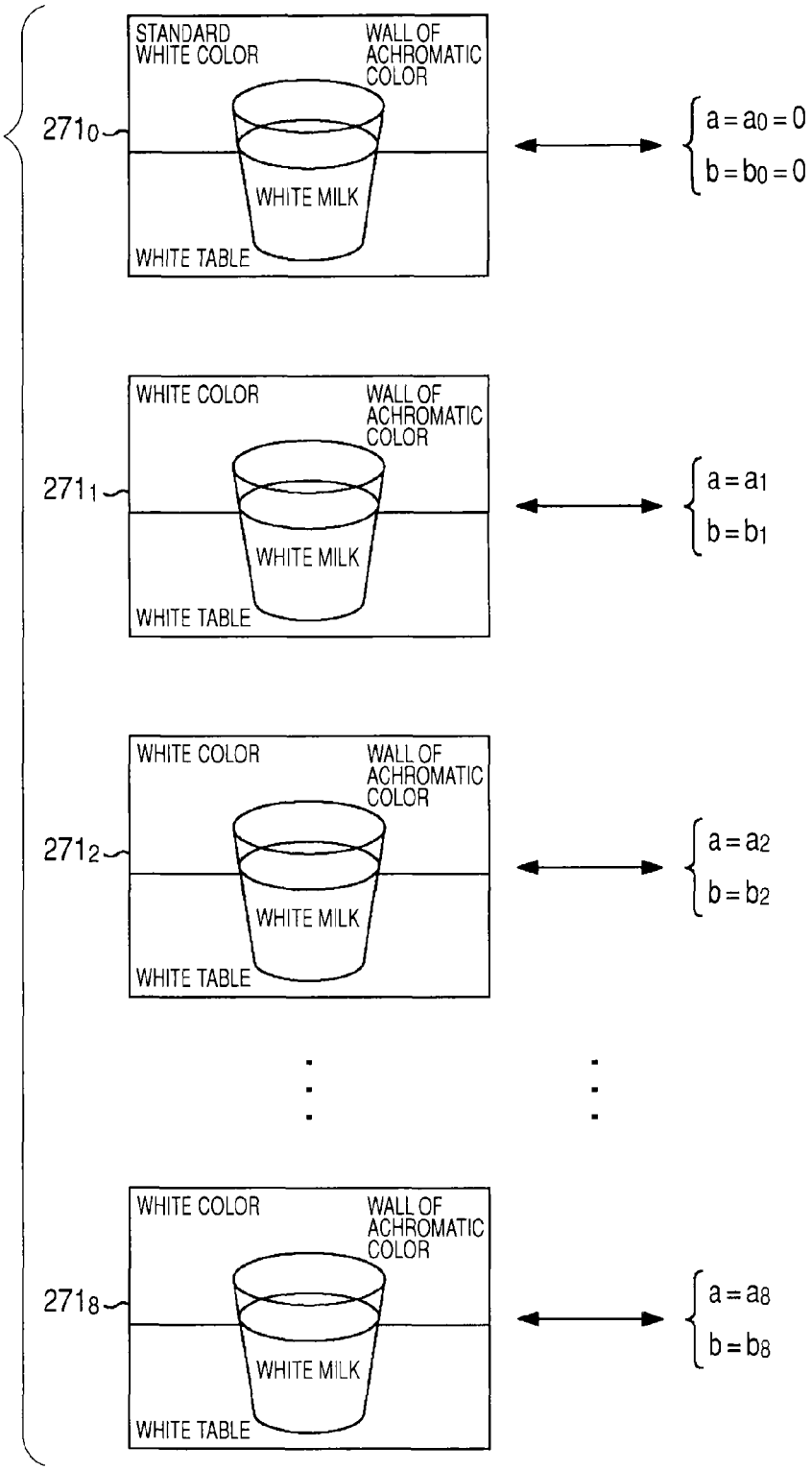
FIG. 7 is a diagram showing revision data stored in a table storage section, including a plurality of white images each through with WB correction by a WB revised correction value, and a WB revision value of a potential parameter correlated with each of the white images.

FIG. 7 is a diagram showing the revision data stored in the table storage section 132, including a plurality of white images each through with WB correction by a WB revised correction value ($g_r$+a, $g_b$+b), and a WB revision value (a, b) of a potential parameter correlated with each of the white images.

White images $271_0$ to $271_8$ are each being a result of applying WB correction to a white image captured for use for revision data (hereinafter, referred to as original white image as appropriate) using 9 different WB revised correction values ($g_r$+a, $g_b$+b). The white image $271_n$ is correlated with a WB revision value ($a_n$, $b_n$) used for revision of a WB standard value ($g_r$, $g_b$). The WB standard value ($g_r$, $g_b$) is the one used to derive a WB revised correction value ($g_r$+$a_n$, $g_b$+$b_n$) used for the WB correction of the original white image (n=0, 1, . . . 7, and 8).

The original white image is of white-based, and includes a white table and a water-clear glass filled with white milk and disposed on the white table with a background wall of achromatic color, for example.

As described above, the white images $271_0$ to $271_8$ are the results of applying WB correction to the original white image using the 9 WB revised correction values of ($g_r$+$a_0$, $g_b$+$b_0$) to ($g_r$+$a_8$, $g_b$+$b_8$), and are varying in hue. The WB revision value ($a_0$, $b_0$) is (0, 0), and thus the white image $271_0$ is a result of applying WB correction to the original white image with the WB revised correction value ($g_r$+0, $g_b$+0) being, as it is, the WB standard value ($g_r$, $g_b$) calculated by the standard value calculation section 204 of the digital camera 81.

At the time of initial setting of the digital camera 81, displayed on the display section 126 are the white images $271_0$ to $271_8$ stored in the table storage section 132.

Figure 8:
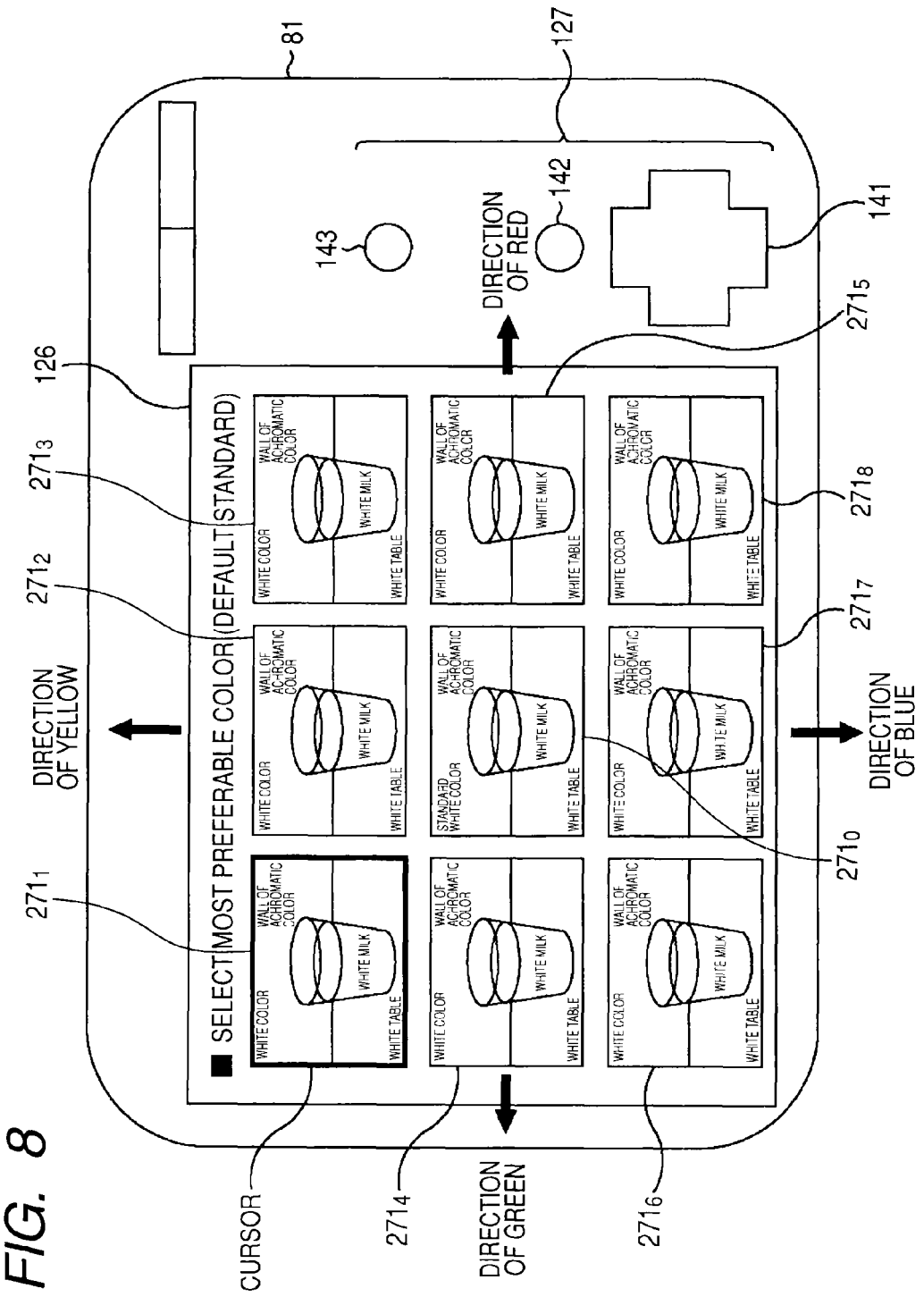
FIG. 8 is a plan view of the digital camera showing the white images of FIG. 7 displayed on a display section.

FIG. 8 is a plan view of the digital camera 81 in which the white images $271_0$ to $271_8$ are displayed on the display section 126.

That is, FIG. 8 is a plan view of the digital camera 81 viewed from the rear surface side, and the surface provided with a lens (not shown) is the front surface side of the digital camera 81.

The rear surface of the digital camera 81 is provided with the display section 126 and the operation section 127.

At the time of initial setting, the display section 126 displays thereon the white images $271_0$ to $271_8$ with the placement of 3 columns and 3 rows, for example.

In FIG. 8, the white image $271_0$ with the WB revision value (a, b) being (0, 0) is disposed at the center of the display section 126. In the drawing, with reference to the white image $271_0$, the white image disposed on the right side thereof looks reddish, the white image disposed on the left side thereof looks greenish, the white image disposed thereabove looks yellowish, and the white image disposed therebeneath looks bluish.

As such, in FIG. 8, the white images $271_3$, $271_5$, and $271_8$ on the right side of the white image $271_0$ look reddish, and the white images $271_1$, $271_4$, and $271_6$ on the left side of the white image $271_0$ look greenish. The white images $271_1$, $271_2$, and $271_3$ above the white image $271_0$ look yellowish, and the white images $271_6$, $271_7$, and $271_8$ beneath the white image $271_0$ look bluish.

The display section 126 displays thereon also a cursor in addition to the white images $271_0$ to $271_8$. The cursor is moved when a user operates the cross key 141. Through operation of the cross key 141, the user moves the cursor to the position of any of the white images $271_0$ to $271_8$ displayed on the display section 126, i.e., white image $271_n$, depending on his or her color (white) preferences. After such cursor movement, the white image $271_n$ is selected if the user operates the enter button 142. In response, the control section 122 of the digital camera 81 goes through a setting of a revision parameter, i.e., the WB revision value (a, b)=($a_n$, $b_n$) of a potential parameter correlated with the selected white image $271_n$ (n=0, 1, . . . 7, and 8).

As described above, because the white images $271_0$ to $271_8$ each has the background wall of achromatic color, the background color of the wall does not affect the user selection of his or her preferred white color, i.e., the user can select his or her preferred white color by simply looking at the white table or the white milk filled in the glass.

The number of sets is not necessarily 9 as described above, i.e., set of a white image and a WB revision value (a, b) of a potential parameter correlated with the white image, and the set may be also plurally provided, i.e., n sets (n=2, 3, . . . ). With this being the case, when n is large in number, it means that the user has a wider choice of white image options so that an image meeting better the user preferences for white can be used for revision parameter setting prior to WB correction.

The revision data stored in the table storage section 132 of FIG. 3 includes, in addition to the above-described sets each of a white image and a potential parameter being a WB revision value, a plurality of sets each of a skin-color image and a potential parameter being a color-correction matrix revision value correlated with the skin-color image.

Figure 9:
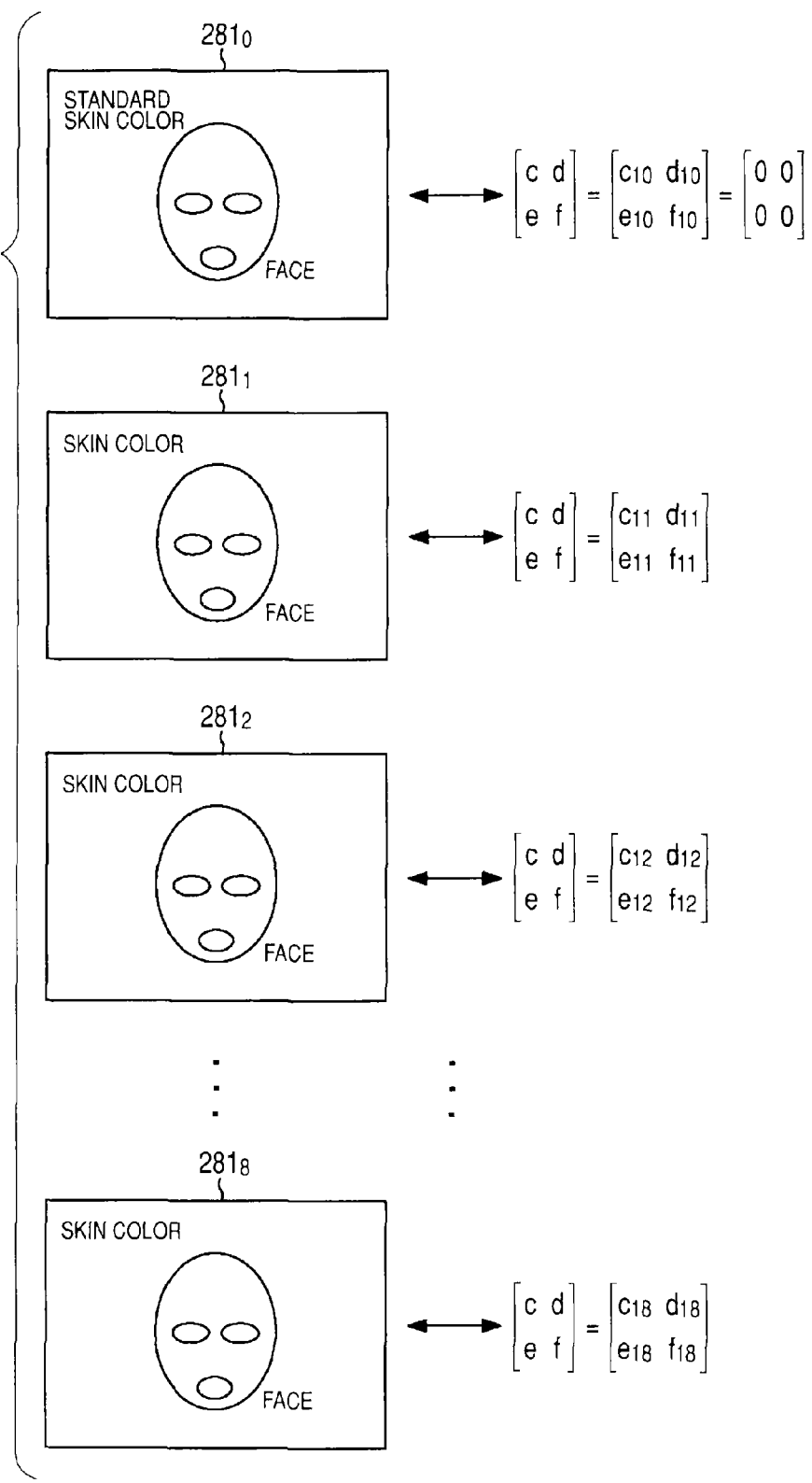
FIG. 9 is a diagram showing the revision data stored in the table storage section, including a plurality of skin-color images each through with color correction by a color-correction matrix revised correction value, and a color-correction matrix revision value of a potential parameter correlated with each of the skin-color images.

FIG. 9 is a diagram showing the revision data stored in the table storage section 132, including a plurality of skin-color images each through with color correction by a color-correction matrix revised correction value [GainB+c, HueR+d, HueB+e, GainR+f], and a color-correction matrix revision value [c, d, e, f] of a potential parameter correlated with each of the skin-color images.

Skin-color images $281_0$ to $281_8$ are each being a result of applying color correction to a skin-color image captured for use for revision data (hereinafter, referred to as original skin-color image as appropriate) using 9 different color-correction matrix revised correction values [GainB+c, HueR+d, HueB+e, GainR+f]. The skin-color image $281_n$ is correlated with a color-correction matrix revision value ($c_{1n}$, $d_{1n}$, $e_{1n}$, $f_{1n}$) used for revision of the color-correction matrix standard value [GainB, HueR, HueB, GainR]. The color-correction matrix standard value [GainB, HueR, HueB, GainR] is the one used to derive the color-correction matrix revised correction value [GainB+$c_{1n}$, HueR+$d_{1n}$, HueB+$e_{1n}$, GainR+$f_{1n}$] used for the color correction of the original skin-color image (n=0, 1, . . . 7, and 8).

The original skin-color image is of skin-color-based, and includes a face of skin-color at the center with the background of solid skin-color.

As described above, the skin-color images $281_0$ to $281_8$ are those each being a result of applying color correction to the original skin-color image using 9 different color-correction matrix revised correction values [GainB+$c_{10}$, HueR+$d_{10}$, HueB+$e_{10}$, GainR+$f_{10}$] to [GainB+$c_{18}$, HueR+$d_{18}$, HueB+$e_{18}$, GainR+$f_{18}$], and are varying in hue. The color-correction matrix revision value ($c_{10}$, $d_{10}$, $e_{10}$, $f_{10}$) is [0, 0, 0, 0], and thus the skin-color image $281_0$ is a result of applying color correction to the original skin-color image with the color-correction matrix revised correction value [GainB+0, HueR+0, HueB+0, GainR+0] being, as it is, the color-correction matrix standard value [GainB, HueR, HueB, GainR] calculated by the standard value calculation section 204 of the digital camera 81.

At the time of initial setting of the digital camera 81, similarly to the above-described case with the white images $271_0$ to $271_8$, displayed on the display section 126 are the skin-color images $281_0$ to $281_8$ stored in the table storage section 132.

Figure 10:
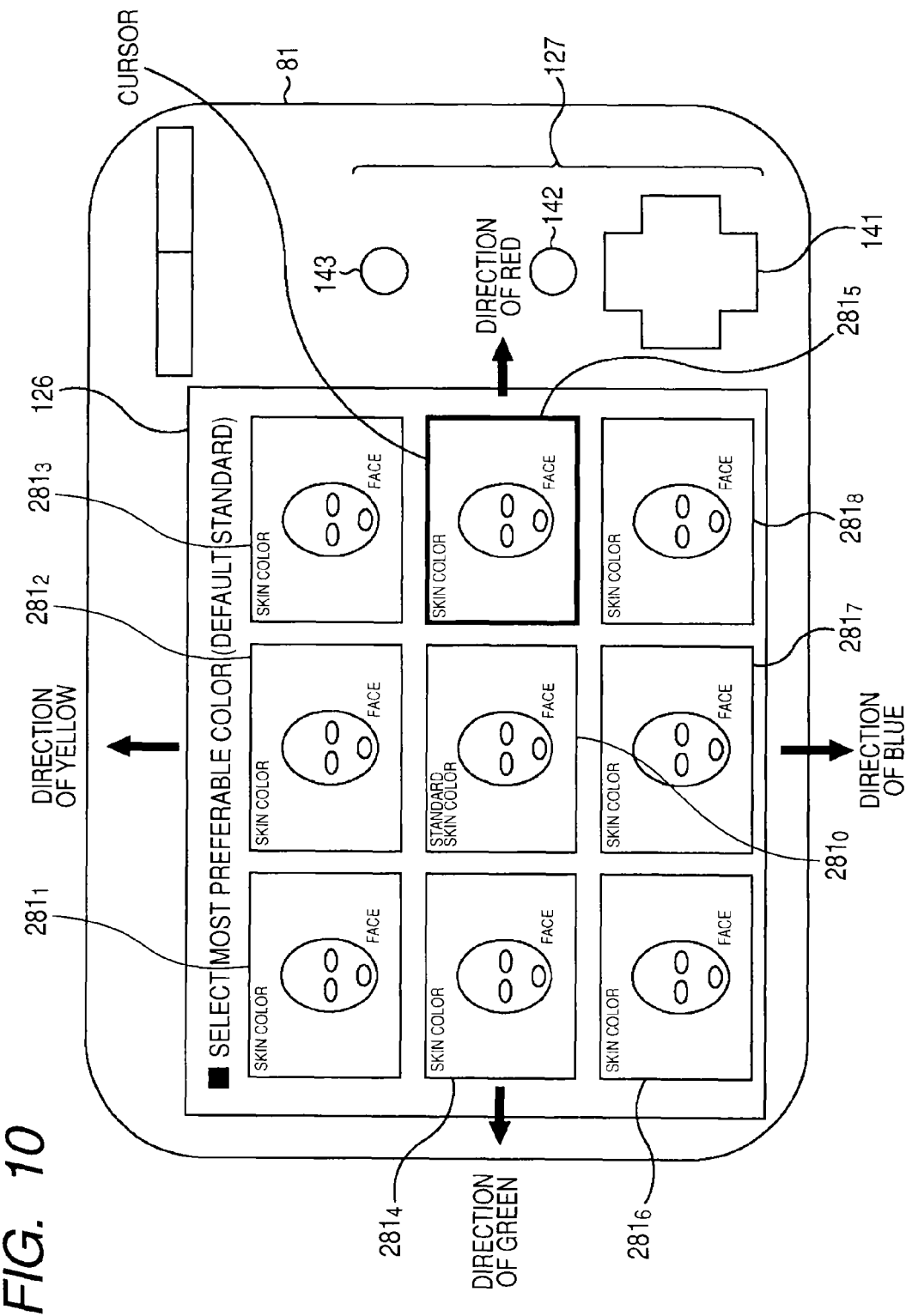
FIG. 10 is a plan view of the digital camera showing the skin-color images of FIG. 9 displayed on the display section.

FIG. 10 is a plan view of the digital camera 81 in which the skin-color images $281_0$ to $281_8$ are displayed on the display section 126.

In FIG. 10, as alternatives to the white images $271_0$ to $271_8$ of FIG. 8, displayed on the display section 126 are the skin-color images $281_0$ to $281_8$.

That is, in FIG. 10, the skin-color image $281_0$ with the color-correction matrix revision value (c, d, e, f) being (0, 0, 0, 0) is disposed at the center of the display section 126. In the drawing, with reference to the skin-color image $281_0$, the skin-color image disposed on the right side thereof looks reddish, the skin-color image disposed on the left side thereof looks greenish, the skin-color image disposed thereabove looks yellowish, and the skin-color image disposed therebeneath looks bluish.

As such, in FIG. 10, the skin-color images $281_3$, $281_5$, and $281_8$ on the right side of the skin-color image $281_0$ look reddish, and the skin-color images $281_1$, $281_4$, and $281_6$ on the left side of the skin-color image $281_0$ look greenish. The skin-color images $281_1$, $281_2$, and $281_3$ above the skin-color image $281_0$ look yellowish, and the skin-color images $281_6$, $281_7$, and $281_8$ beneath the skin-color image $281_0$ look bluish.

The display section 126 displays thereon also a cursor in addition to the skin-color images $281_0$ to $281_8$. The cursor is moved when a user operates the cross key 141. Through operation of the cross key 141, the user moves the cursor to the position of any of the skin-color images $281_0$ to $281_8$ displayed on the display section 126, i.e., skin-color image $281_n$, depending on his or her color (skin-color) preferences. After such cursor movement, the skin-color image $281_n$ is selected if the user operates the enter button 142. In response, the control section 122 of the digital camera 81 goes through a setting of a revision parameter, i.e., the color-correction matrix revision value [c, d, e, f]=[$c_{1n}$, $d_{1n}$, $e_{1n}$, $f_{1n}$] of a potential parameter correlated with the selected skin-color image $281_n$ (n=0, 1, . . . 7, and 8).

The revision data stored in the table storage section 132 includes, also for blue images similarly to the above-described skin-color images $281_0$ to $281_8$, a plurality of sets each of a blue image and a potential parameter being a color-correction matrix revision value correlated with the blue image. The revision data also includes, also for green images similarly to the above-described skin-color images $281_0$ to $281_8$, a plurality of sets each of a green image and a potential parameter being a color-correction matrix revision value correlated with the green image.

At the time of initial setting of the digital camera 81, similarly to the above-described case with the skin-color images $281_0$ to $281_8$, a plurality of blue images stored in the table storage section 132 are displayed on the display section 126. Also at the time of initial setting of the digital camera 81, similarly to the above-described case with the skin-color images $281_0$ to $281_8$, a plurality of green images stored in the table storage section 132 are displayed on the display section 126.

Figure 11:
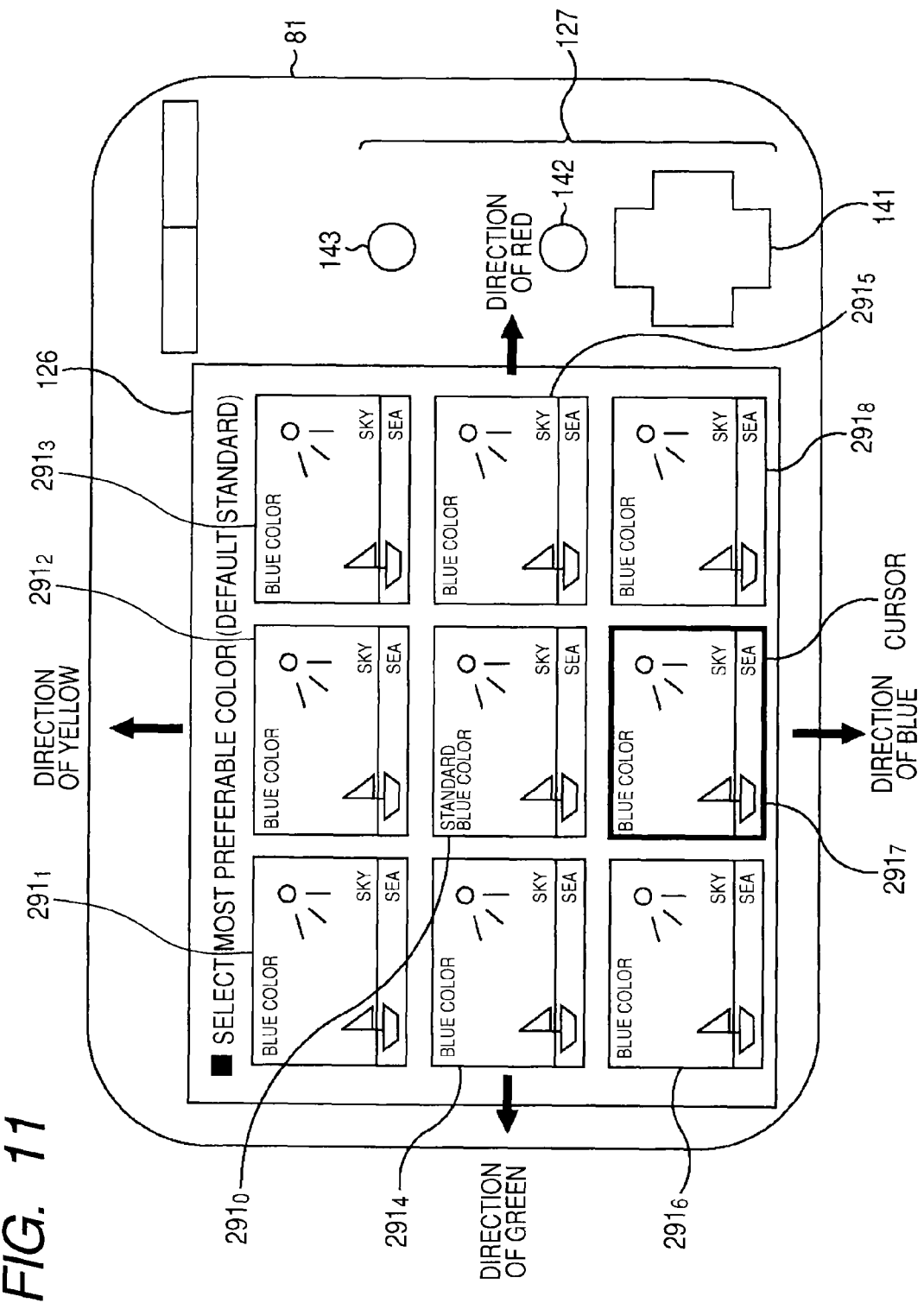
FIG. 11 is a plan view of the digital camera showing the revision data stored in the table storage section, including a plurality of blue images, displayed on the display section, each through with color correction by a color-correction matrix revised correction value.
Figure 12:
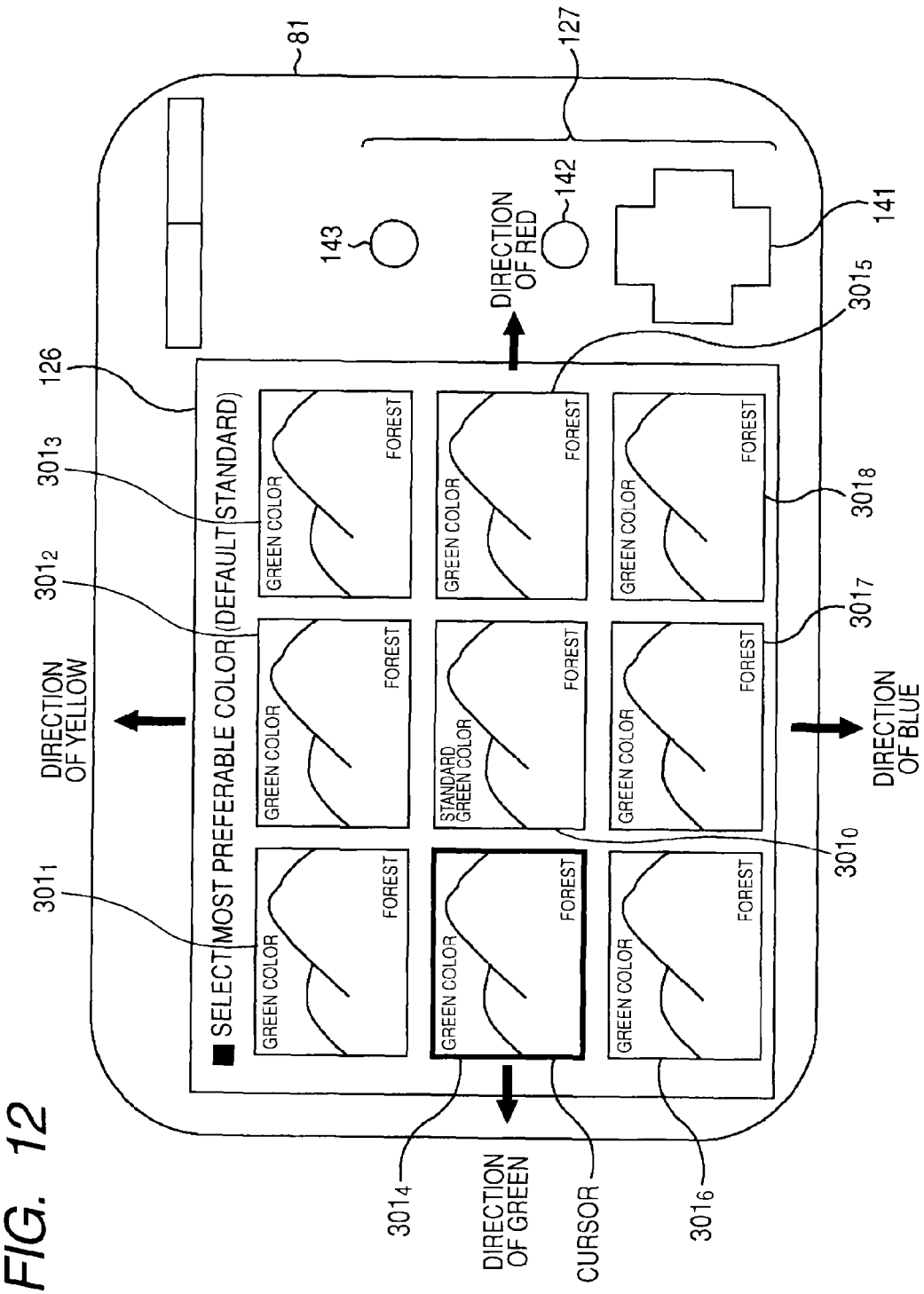
FIG. 12 is a plan view of the digital camera showing the revision data stored in the table storage section, including a plurality of green images, displayed on the display section, each through with color correction by a color-correction matrix revised correction value.

FIG. 11 is a plan view of the digital camera 81 in which a plurality of blue images in the revision data are displayed on the display section 126. FIG. 12 is a plan view of the digital camera 81 in which a plurality of green images in the revision data are displayed on the display section 126.

In FIG. 11, similarly to the skin-color images $281_0$ to $281_8$ of FIG. 10, a plurality of blue images $291_0$ to $291_8$ varying in hue are displayed on the display section 126. In FIG. 12, similarly to the skin-color images $281_0$ to $281_8$ of FIG. 10, a plurality of green images $301_0$ to $301_8$ varying in hue are displayed on the display section 126.

Similarly to the above-described case with the skin-color images $281_0$ to $281_8$, when a user selects any of the blue images $291_0$ to $291_8$ displayed on the display section 126, i.e., blue image $291_n$, depending on his or her preferences, the control section 122 of the digital camera 81 goes through a setting of a revision parameter, i.e., the color-correction matrix revision value [c, d, e, f]=[$c_{2n}$, $d_{2n}$, $e_{2n}$, $f_{2n}$] correlated with the selected blue image $291_n$. Also similarly to the above-described case with the skin-color images $281_0$ to $281_8$, when the user selects any of the green images $301_0$ to $301_8$, i.e., green image $301_n$ displayed on the display section 126, depending on his or her preferences, the control section 122 of the digital camera 81 goes through a setting of a revision parameter, i.e., the color-correction matrix revision value [c, d, e, f]=[$c_{3n}$, $d_{3n}$, $e_{3n}$, $f_{3n}$] correlated with the selected green image $301_n$ (n=0, 1, . . . 7, and 8).

Figure 13:
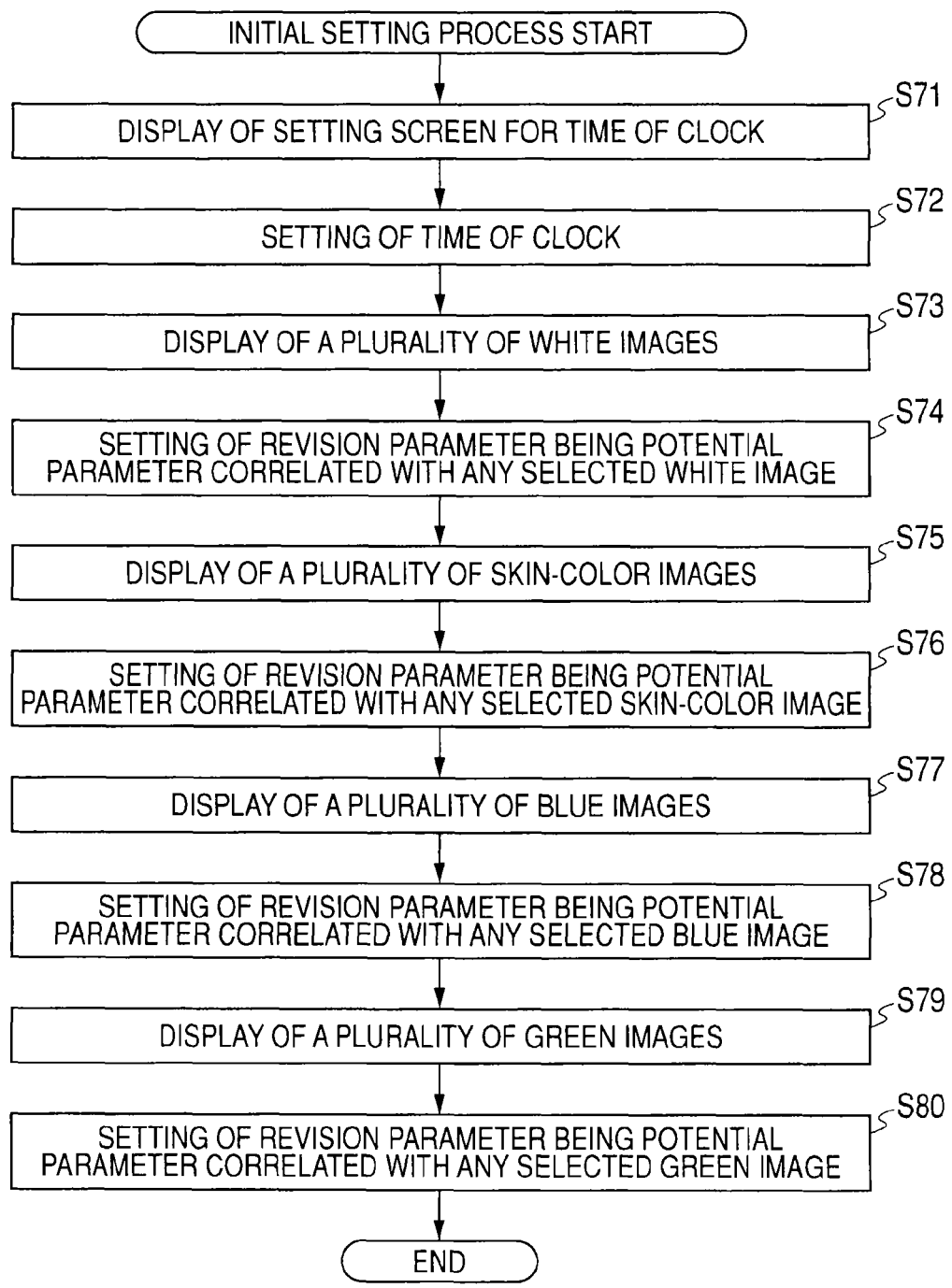
FIG. 13 is a flowchart for illustrating a process of initial setting in the digital camera to which the invention is applied.

By referring to the flowchart of FIG. 13, described next is the process of initial setting of the digital camera 81.

This process is started when the user turns on the digital camera 81 for the first time, or operates the operation section 127 for initial setting, for example.

In step S71, the display control section 125 displays a setting screen on the display section 126 for setting the time of a clock, and waits for the user to operate the operation section 127 for time input. After the user time input, the procedure goes to step S72, and the control section 122 makes a setting of the time of a clock in accordance with the time input made by the user through operation of the operation section 127, i.e., starts counting of time with the input time being the current time. The procedure then goes to step S73.

In step S73, for control over the WB correction, the display control section 125 reads the white images $271_0$ to $271_8$ found in the revision data from the table storage section 132. Thus read white images are supplied to the display section 126 for display thereon. As such, as shown in FIG. 8, the display section 126 displays thereon the white images $271_0$ to $271_8$.

After the user selects any preferred one of the white images $271_0$ to $271_8$ displayed on the display section 126, e.g., white image $271_n$, through operation of the operation section 127, the revision parameter setting section 201 waits for an operation signal coming from the operation section 127 corresponding to the user selection. The procedure then goes from step S73 to S74. In step S74, based on the operation signal provided by the operation section 127, the revision parameter setting section 201 reads, from the table storage section 132, a WB revision value (a, b)=($a_n$, $b_n$) of a potential parameter correlated with the user-selected white image $271_n$. Thus read WB revision value (a, b)=($a_n$, $b_n$) is set as a revision parameter, i.e., supplied to the revision parameter storage section 131 as a revision parameter for storage therein. The procedure then goes to step S75.

In step S75, for control over the color correction, the display control section 125 reads the skin-color images $281_0$ to $281_8$ found in the revision data from the table storage section 132. Thus read skin-color images are supplied to the display section 126 for display thereon. As such, as shown in FIG. 10, the display section 126 displays thereon the skin-color images $281_0$ to $281_8$.

After the user selects any preferred one of the skin-color images $281_0$ to $281_8$ displayed on the display section 126, e.g., skin-color image $281_n$, through operation of the operation section 127, the revision parameter setting section 201 waits for an operation signal coming from the operation section 127 corresponding to the user selection. The procedure then goes from step S75 to S76. In step S76, based on the operation signal provided by the operation section 127, the revision parameter setting section 201 reads, from the table storage section 132, a color-correction matrix revision value [c, d, e, f]=[$c_{1n}$, $d_{1n}$, $e_{1n}$, $f_{1n}$] of a potential parameter correlated with the user-selected skin-color image $281_n$. Thus read color-correction matrix revision value [c, d, e, f]=[$c_{1n}$, $d_{1n}$, $e_{1n}$, $f_{1n}$] is set as a revision parameter, i.e., supplied to the revision parameter storage section 131 as a revision parameter for storage therein. The procedure then goes to step S77.

In step S77, for control over the color correction, the display control section 125 reads the blue images $291_0$ to $291_8$ found in the revision data from the table storage section 132. Thus read blue images are supplied to the display section 126 for display thereon. As such, as shown in FIG. 11, the display section 126 displays thereon the blue images $291_0$ to $291_8$.

After the user selects any preferred one of the blue images $291_0$ to $291_8$ displayed on the display section 126, e.g., blue image $291_n$, through operation of the operation section 127, the revision parameter setting section 201 waits for an operation signal coming from the operation section 127 corresponding to the user selection. The procedure then goes from step S77 to S78. In step S78, based on the operation signal provided by the operation section 127, the revision parameter setting section 201 reads, from the table storage section 132, a color-correction matrix revision value [c, d, e, f]=[$c_{2n}$, $d_{2n}$, $e_{2n}$, $f_{2n}$] of a potential parameter correlated with the user-selected blue image $291_n$. Thus read color-correction matrix revision value [c, d, e, f]=[$c_{2n}$, $d_{2n}$, $e_{2n}$, $f_{2n}$] is set as a revision parameter, i.e., supplied to the revision parameter storage section 131 as a revision parameter for storage therein. The procedure then goes to step S79.

In step S79, for control over the color correction, the display control section 125 reads the green images $301_0$ to $301_8$ found in the revision data from the table storage section 132. Thus read green images are supplied to the display section 126 for display thereon. As such, as shown in FIG. 12, the display section 126 displays thereon the green images $301_0$ to $301_8$.

After the user selects any preferred one of the green images $301_0$ to $301_8$ displayed on the display section 126, e.g., green image $301_n$, through operation of the operation section 127, the revision parameter setting section 201 waits for an operation signal coming from the operation section 127 corresponding to the user selection. The procedure then goes from step S79 to S80. In step S80, based on the operation signal provided by the operation section 127, the revision parameter setting section 201 reads, from the table storage section 132, a color-correction matrix revision value [c, d, e, f]=[$c_{3n}$, $d_{3n}$, $e_{3n}$, $f_{3n}$] of a potential parameter correlated with the user-selected green image $301_n$. Thus read color-correction matrix revision value [c, d, e, f]=[$c_{3n}$, $d_{3n}$, $e_{3n}$, $f_{3n}$] is set as a revision parameter, i.e., supplied to the revision parameter storage section 131 as a revision parameter for storage therein. This is the end of the process.

The revision parameter is set simply by a user selecting his or her preferred images as such so that control such as white balance and color correction can be exercised with ease to meet the user preferences.

Figure 14:
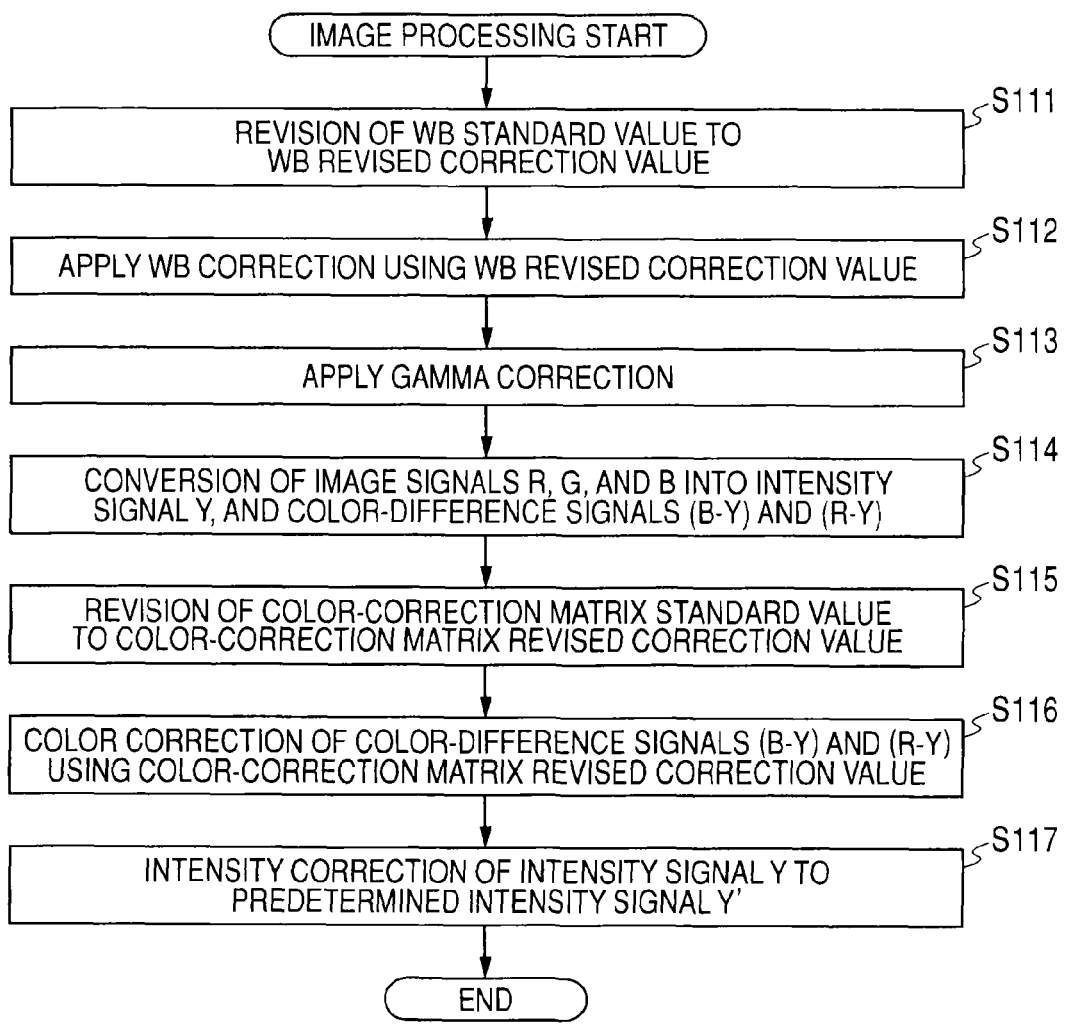
FIG. 14 is a flowchart for illustrating image processing in the image processing section of FIG. 3.

By referring to the flowchart of FIG. 14, described next is the image processing in the image processing section 123 of FIG. 6 using a revision parameter set as above.

This processing is executed every time an image captured by the imaging section 121 of FIG. 3 is supplied to the image processing section 123, for example.

Note here that, from the standard value calculation section 204 of the control section 122 to the image processing section 123, a WB standard value and a color-correction matrix standard value are supplied as appropriate. Moreover, from the revision parameter acquisition section 205 of the control section 122 to the image processing section 123, the latest revision parameter set in the process of initial setting of FIG. 13 is provided.

In step S111, the WB correction section 231 revises the WB standard value provided by the standard value calculation section 204 of the control section 122 of FIG. 5 so that a WB revised correction value is derived. This value revision is performed using a WB revision value being any one of revision parameters provided by the revision parameter acquisition section 205 of the control section 122. The procedure then goes to step S112.

In step S112, using the WB revised correction value being the revision result of the WB standard value, the WB correction section 231 applies WB correction to the captured image provided by the imaging section 121. The WB-corrected captured image is forwarded to the gamma correction section 232, and the procedure goes to step S113. In step S113, the gamma correction section 232 applies gamma correction to the captured image provided by the WB correction section 231. The gamma-corrected captured image is forwarded to the signal conversion section 233, and the procedure goes to step S114.

In step S114, the signal conversion section 233 converts the captured image provided by the gamma correction section 232, i.e., digital image signals R, G, and B, into an intensity signal Y, and color-difference signals (B−Y) and (R−Y). The signal conversion section 233 then determines a correlated color using the coordinates (B−Y, R−Y) defined by the color-difference signals (B−Y) and (R−Y). The signal conversion section 233 forwards the correlated color and the color-difference signals (B−Y) and (R−Y) to the color-difference signal correction section 235, and the intensity signal Y to the intensity correction section 234. The procedure then goes from step S114 to S115.

In step S115, based on the correlated color provided by the signal conversion section 233, the color-difference signal correction section 235 selects one of the color-correction matrix revision values being the revision parameters provided by the revision parameter acquisition section 205 of the control section 122. Also in step S115, using the selected color-correction matrix revision value, the color-difference signal correction section 235 revises the color-correction matrix standard value provided by the standard value calculation section 204 of the control section 122 of FIG. 5 so that a color-correction matrix revised correction value is derived. The procedure then goes to step S116.

In step S116, the color-difference signal correction section 235 performs color correction of correcting the color-difference signals (B−Y) and (R−Y) provided by the signal conversion section 233 using the color-correction matrix revised correction value being the revision result of the color-correction matrix standard value. The resulting color-difference signals (B−Y)" and (R−Y)" are forwarded to the display control section 125, and the procedure goes to step S117.

In step S117, the intensity correction section 234 applies intensity correction to the intensity signal Y provided by the signal conversion section 233, and the resulting intensity signal Y' is forwarded to the display control section 125. This is the end of the process.

Figure 15:
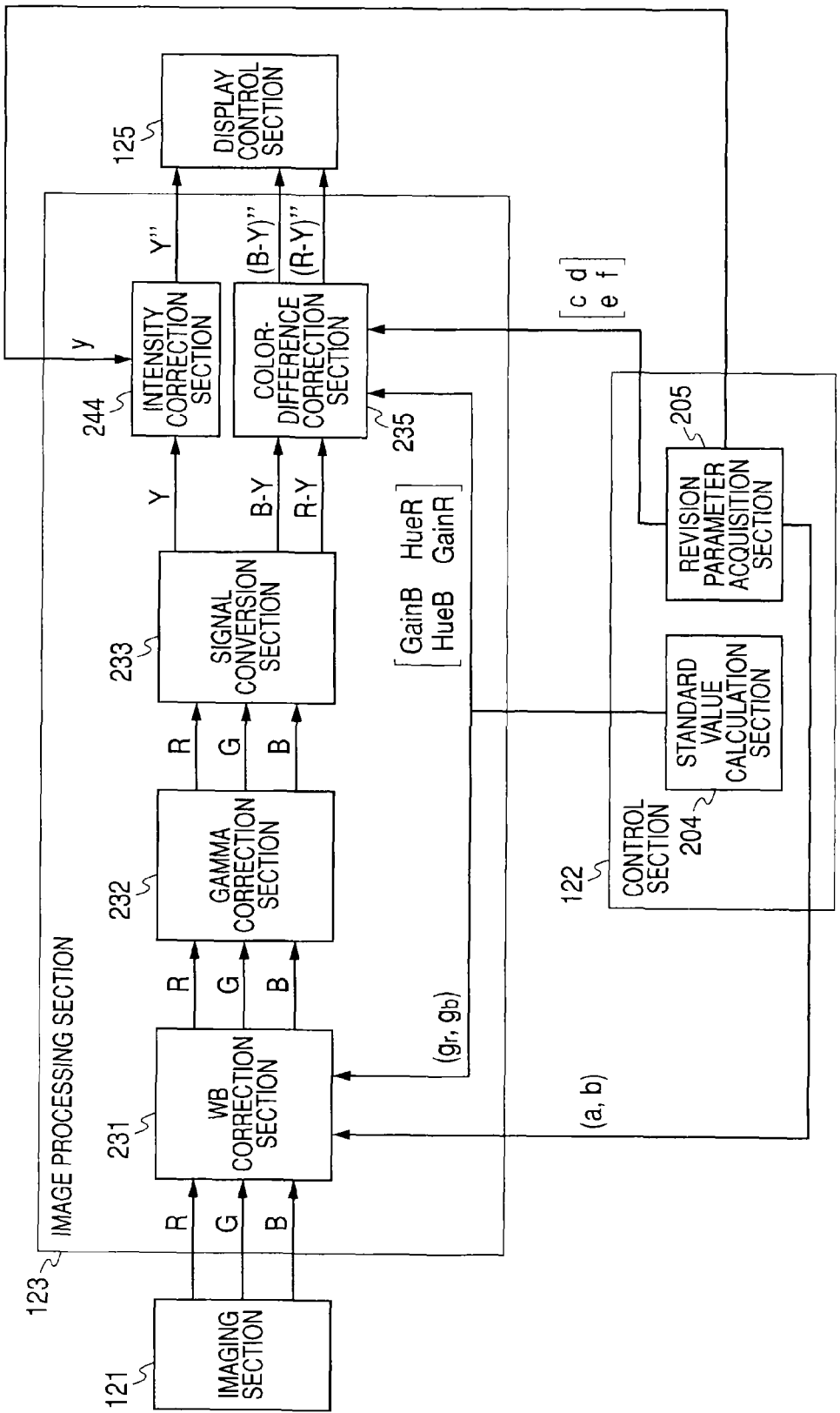
FIG. 15 is a block diagram showing another exemplary detailed configuration of the image processing section of FIG. 3.

FIG. 15 is a block diagram showing another exemplary configuration of the image processing section 123 of FIG. 3.

That is, the image processing section 123 of FIG. 15 is provided with an intensity correction section 244 as an alternative to the intensity correction section 234 of FIG. 6. This is the only difference, and the remaining of the image processing section 123 of FIG. 15 is similar to that of FIG. 6.

The intensity correction section 244 is provided with, from the signal conversion section 233, a correlated color for the coordinates (B−Y, R−Y) and an intensity signal Y, and from the revision parameter acquisition section 205, a revision parameter is provided.

The intensity correction section 244 calculates an intensity standard value using the intensity signal Y provided by the signal conversion section 233 for correcting the intensity signal Y to a predetermined intensity signal. The intensity correction section 244 also selects, based on the correlated color provided by the signal conversion section 233, one of the intensity revision values for use to revise the intensity standard value being the calculation result. The intensity revision values here are the revision parameters provided by the revision parameter acquisition section 205.

That is, in the embodiment of FIG. 15, the revision parameters provided to the image processing section 123 from the revision parameter acquisition section 205 of the control section 122 include not only a WB revision value and a color-correction matrix revision value but also an intensity revision value for revision of an intensity standard value. The intensity revision value found in the revision parameters is correlated with any one of a white image, a blue image, a skin-color image, and a green image, for example. When the correlated color is any one of white, blue, skin-color, and green, for example, the intensity correction section 244 selects an intensity revision value correlated with the image of the correlated color, i.e., white image, blue image, skin-color image, or green image.

When the correlated color is not white, blue, skin-color, or green, the intensity correction section 244 sets the intensity revision value to 0, for example.

The intensity correction section 244 revises the intensity standard value by adding together an intensity revision value and an intensity standard value calculated from the intensity signal Y provided by the signal conversion section 233. The intensity revision value here is the one selected from those others found in the revision parameters provided by the revision parameter acquisition section 205. Using the resulting intensity revised correction value, the intensity correction section 244 applies intensity correction to the intensity signal Y provided by the signal conversion section 233.

To be specific, the intensity correction section 244 performs intensity correction of correcting the intensity signal Y to an intensity signal Y″ through a computation of Equation (7) below.

$$Y''=Y+(h+y) \qquad (7)$$

In Equation (7), h denotes an intensity standard value calculated by the intensity correction section 244, and y denotes an intensity correction value selected by the intensity correction value 244. Accordingly, (h+y) denotes an intensity revised correction value.

Thereafter, the intensity correction section 244 supplies, to the display control section 125, the intensity signal Y″ as a result of the intensity correction performed to the intensity signal Y.

Herein, for the revision parameter acquisition section 205 of the control section 122 to supply an intensity revision value y to the intensity correction section 244 as a revision parameter, the revision parameter storage section 131 of FIG. 3 is required to previously include a revision parameter including the intensity revision value y. For storing such a revision parameter including the intensity revision value y into the revision parameter storage section 131, the table storage section 132 is required to previously include the intensity revision value y as a potential parameter.

In consideration thereof, in the embodiment of FIG. 15, the table storage section 132 stores therein revision data including sets each of an image, e.g., white image, skin-color image, blue image, and green image, and a potential parameter correlated with the image.

Figure 16:
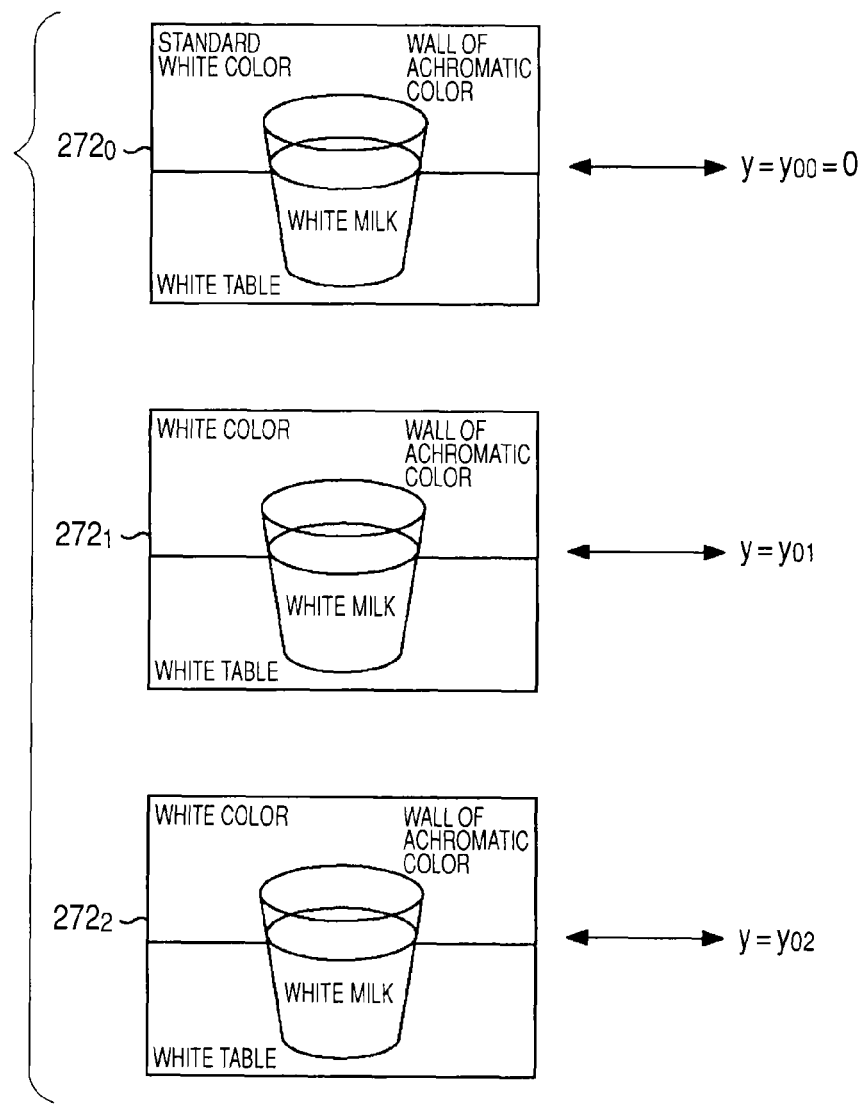
FIG. 16 is a diagram showing the revision data stored in the table storage section, including a plurality of white images each through with intensity correction by an intensity revised correction value, and an intensity revision value of a potential parameter correlated with each of the white images.

FIG. 16 is a diagram showing the revision data stored in the table storage section 132, including a plurality of white images each through with intensity correction by an intensity revised correction value (h+y), and an intensity revision value y of a potential parameter corresponding to each of the white images.

White images $272_0$ to $272_2$ are each being a result of applying intensity correction to an original white image using 3 different intensity revised correction values $(h+y_{0k})$. The white image $272_k$ is correlated with an intensity revision value $y_{0k}$ used for revision of the intensity standard value h for deriving an intensity revised correction value $(h+y_{0k})$ used for the intensity correction of the original white image (k=0, 1, and 2).

As described above, the white images $272_0$ to $272_2$ are those each being a result of applying intensity correction to the original white image using the 3 different intensity revised correction values $(h+y_{00})$ to $(h+y_{02})$, and are varying in brightness (lightness). Herein, the intensity revision value $y_{00}$ is 0, and thus the white image $272_0$ is a result of applying intensity correction to the original white image with the intensity revised correction value (h+0) being, as it is, the intensity standard value h calculated by the intensity correction section 244 of the digital camera 81.

At the time of initial setting of the digital camera 81, similarly to the above-described case with the white images $271_0$ to $271_8$, displayed on the display section 126 are the white images $272_0$ to $272_2$ stored in the table storage section 132.

Figure 17:
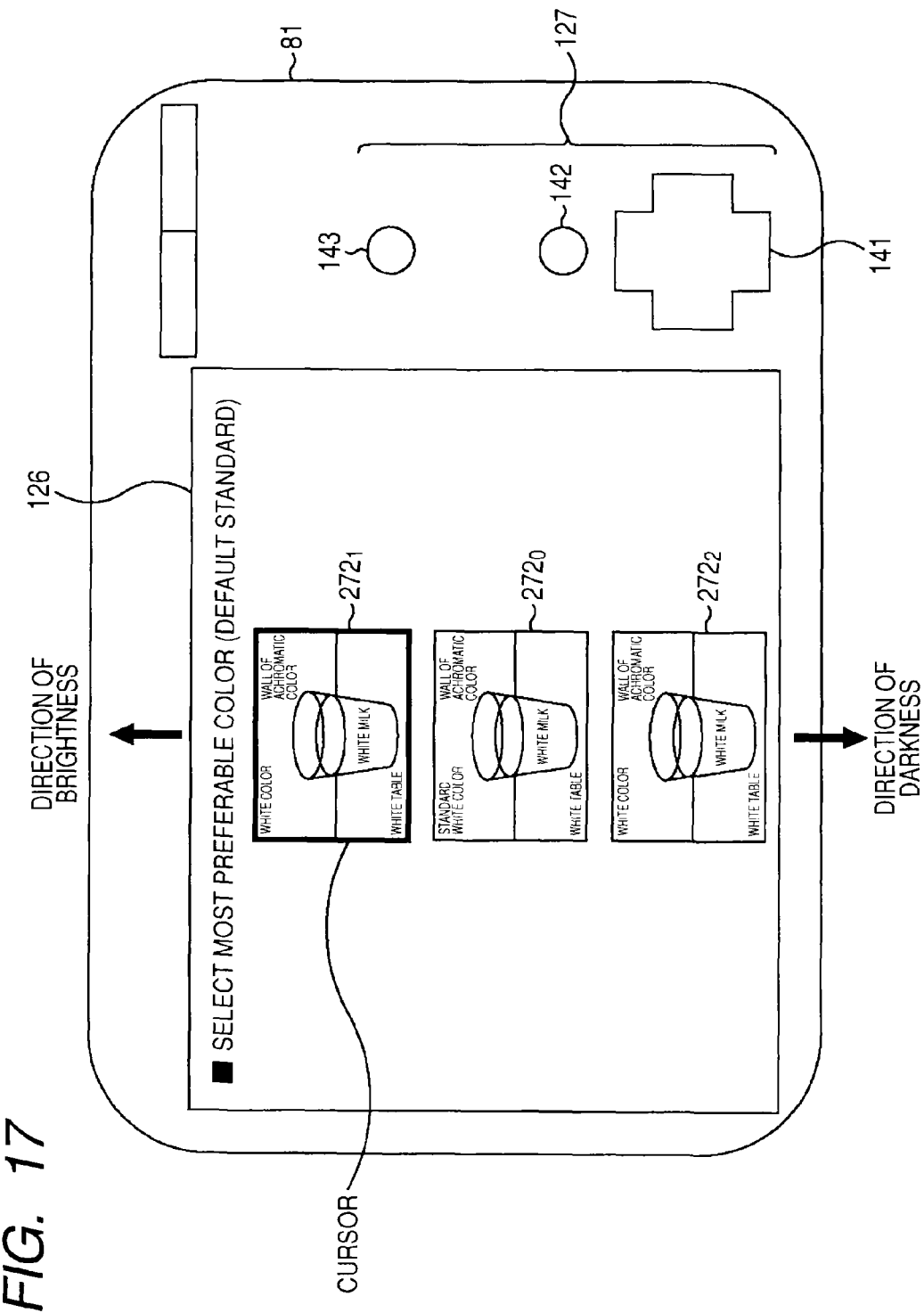
FIG. 17 is a plan view of the digital camera showing the white images of FIG. 16 displayed on the display section.

FIG. 17 is a plan view of the digital camera 81 in which the white images $272_0$ to $272_2$ are displayed on the display section 126.

That is, FIG. 17 is a plan view of the digital camera 81 viewed from the rear surface side, and the display section 126 on the rear surface side displays thereon the white images $272_0$ to $272_2$ aligned in the vertical direction from top to bottom in the drawing.

In FIG. 17, the white image $272_0$ with the intensity revision value y being 0 is disposed at the center of the display section 126. In the drawing, with reference to the white image $272_0$, the white image $272_1$ disposed thereabove looks brighter, and the white image $272_2$ disposed therebeneath looks darker.

The display section 126 displays also a cursor in addition to the white images $272_0$ to $272_2$. The cursor is moved when a user operates the cross key 141. Through operation of the cross key 141, the user moves the cursor to the position of any of the white images $272_0$ to $272_2$ displayed on the display section 126, i.e., white image $272_k$, depending on his or her color (white) preferences. After such cursor movement, the white image $272_k$ is selected if the user operates the enter button 142. In response, the control section 122 of the digital camera 81 goes through a setting of a revision parameter, i.e., the intensity revision value $y_{0k}$ of a potential parameter correlated with the selected white image $272_k$ (k=0, 1, and 2).

The number of sets is not necessarily 3 as described above, i.e., set of a white image and an intensity revision value y of a potential parameter correlated with the white image, and the set may be also plurally provided, i.e., n sets (n=2, 4, 5, 6 . . . ). With this being the case, when n is large in number, it means that the user has a wider choice of white image options so that an image meeting better the user preferences for (white) brightness can be used for revision parameter setting prior to intensity correction.

The revision data stored in the table storage section 132 of FIG. 3 includes, in addition to the above-described sets each of a white image and a potential parameter being an intensity revision value, a plurality of sets each of a skin-color image and a potential parameter being an intensity revision value correlated with the skin-color image.

Figure 18:
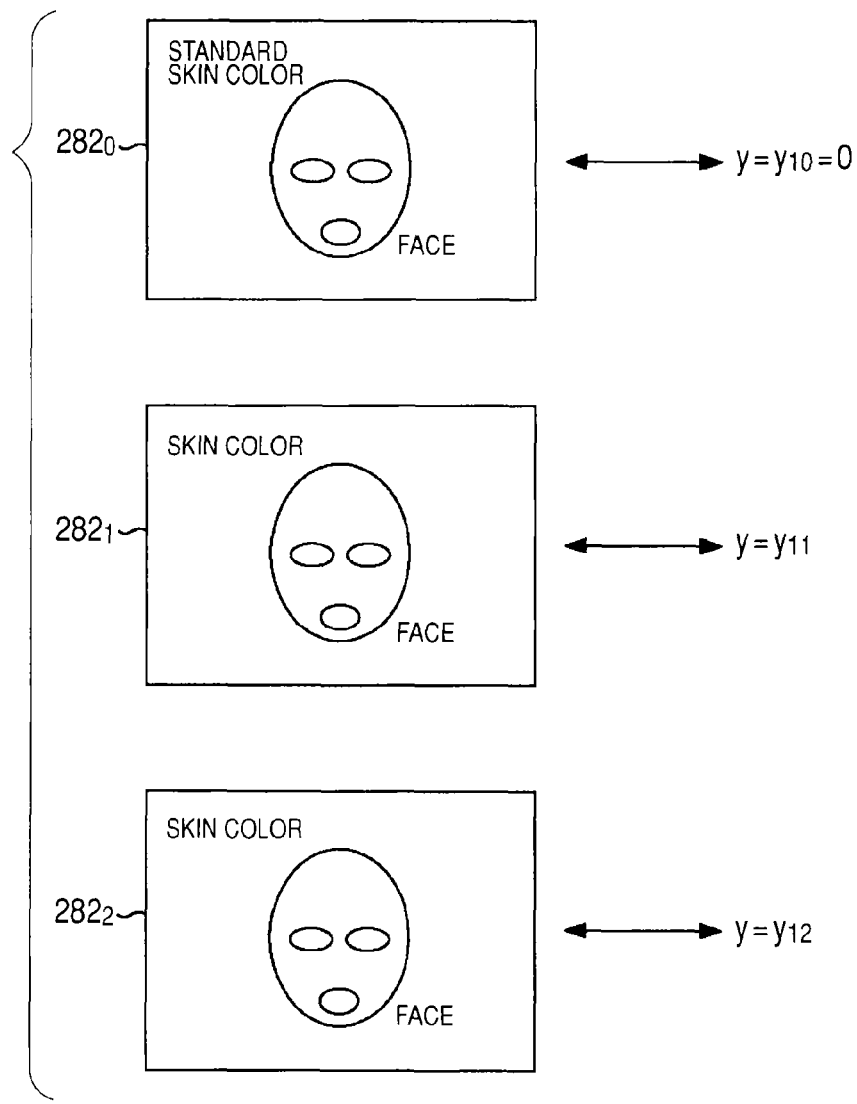
FIG. 18 is a diagram showing the revision data stored in the table storage section, including a plurality of skin-color images each through with intensity correction by an intensity revised correction value, and an intensity revision value of a potential parameter correlated with each of the skin-color images.

FIG. 18 is a diagram showing the revision data stored in the table storage section 132, including a plurality of skin-color images each through with correction by an intensity revised correction value (h+y), and an intensity revision value y of a potential parameter corresponding to each of the skin-color images.

Skin-color images $282_0$ to $282_2$ are each being a result of applying intensity correction to an original skin-color image using 3 different intensity revised correction values $(h+y_{1k})$. The skin-color image $282_k$ is correlated with an intensity revision value $y_{1k}$ used for revision of the intensity standard value h for deriving an intensity revised correction value $(h+y_{1k})$ used for the intensity correction of the original skin-color image (k=0, 1, and 2).

As described above, the skin-color images $282_0$ to $282_2$ are those each being a result of applying intensity correction to the original skin-color image using 3 different intensity revised correction values $(h+y_{10})$ to $(h+y_{12})$, and are varying in brightness. Herein, the intensity revision value $y_{10}$ is 0, and thus the skin-color image $282_0$ is a result of applying intensity correction to the original skin-color image with the intensity revised correction value (h+0) being, as it is, the intensity standard value h calculated by the intensity correction section 244 of the digital camera 81.

At the time of initial setting of the digital camera 81, similarly to the above-described case with the white images $272_0$ to $272_2$, displayed on the display section 126 are the skin-color images $282_0$ to $282_2$ stored in the table storage section 132.

Figure 19:
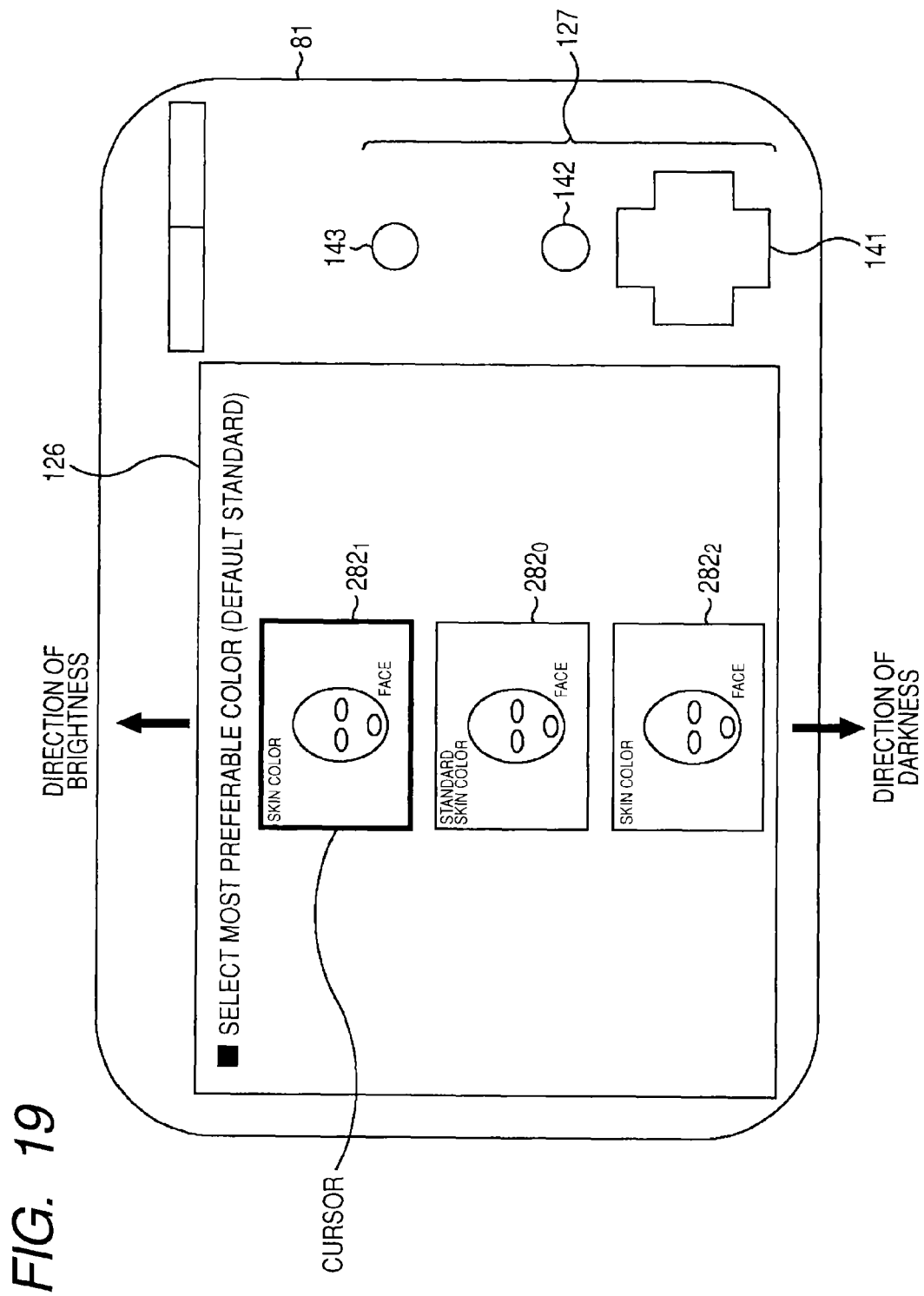
FIG. 19 is a plan view of the digital camera showing the skin-color images of FIG. 18 displayed on the display section.

FIG. 19 is a plan view of the digital camera 81 in which the skin-color images $282_0$ to $282_2$ are displayed on the display section 126.

In FIG. 19, as alternatives to the white images $272_0$ to $272_2$ of FIG. 17, the skin-color images $282_0$ to $282_2$ are displayed on the display section 126.

That is, in FIG. 19, the skin-color image $282_0$ with the intensity revision value y being 0 is disposed at the center of the display section 126. In the drawing, with reference to the skin-color image $282_0$, the skin-color image $282_1$ disposed thereabove looks brighter, and the skin-color image $282_2$ disposed therebeneath looks darker.

Similarly to the above-described case with the white images $272_0$ to $272_2$, when a user selects any of the skin-color images $282_0$ to $282_2$ displayed on the display section 126, i.e., skin-color image $282_k$, depending on his or her preferences, the control section 122 of the digital camera 81 goes through a setting of a revision parameter, i.e., the intensity revision value $y_{1k}$ correlated with the selected skin-color image $282_k$ (n=0, 1, and 2).

Also for blue images, similarly to the above-described case with the skin-color images $282_0$ to $282_2$, the revision data stored in the table storage section 132 of FIG. 3 includes a plurality of sets each of a blue image and a potential parameter being an intensity revision value correlated with the blue image. Also for green images, similarly to the above-described case with the skin-color images $282_0$ to $282_2$, the revision data includes a plurality of sets each of a green image and a potential parameter being an intensity revision value correlated with the green image.

At the time of initial setting of the digital camera 81, similarly to the above-described case with the skin-color images $282_0$ to $282_2$, a plurality of blue images stored in the table storage section 132 are displayed on the display section 126. Also at the time of initial setting of the digital camera 81, similarly to the above-described case with the skin-color images $282_0$ to $282_2$, a plurality of green images stored in the table storage section 132 are displayed on the display section 126.

Figure 20:
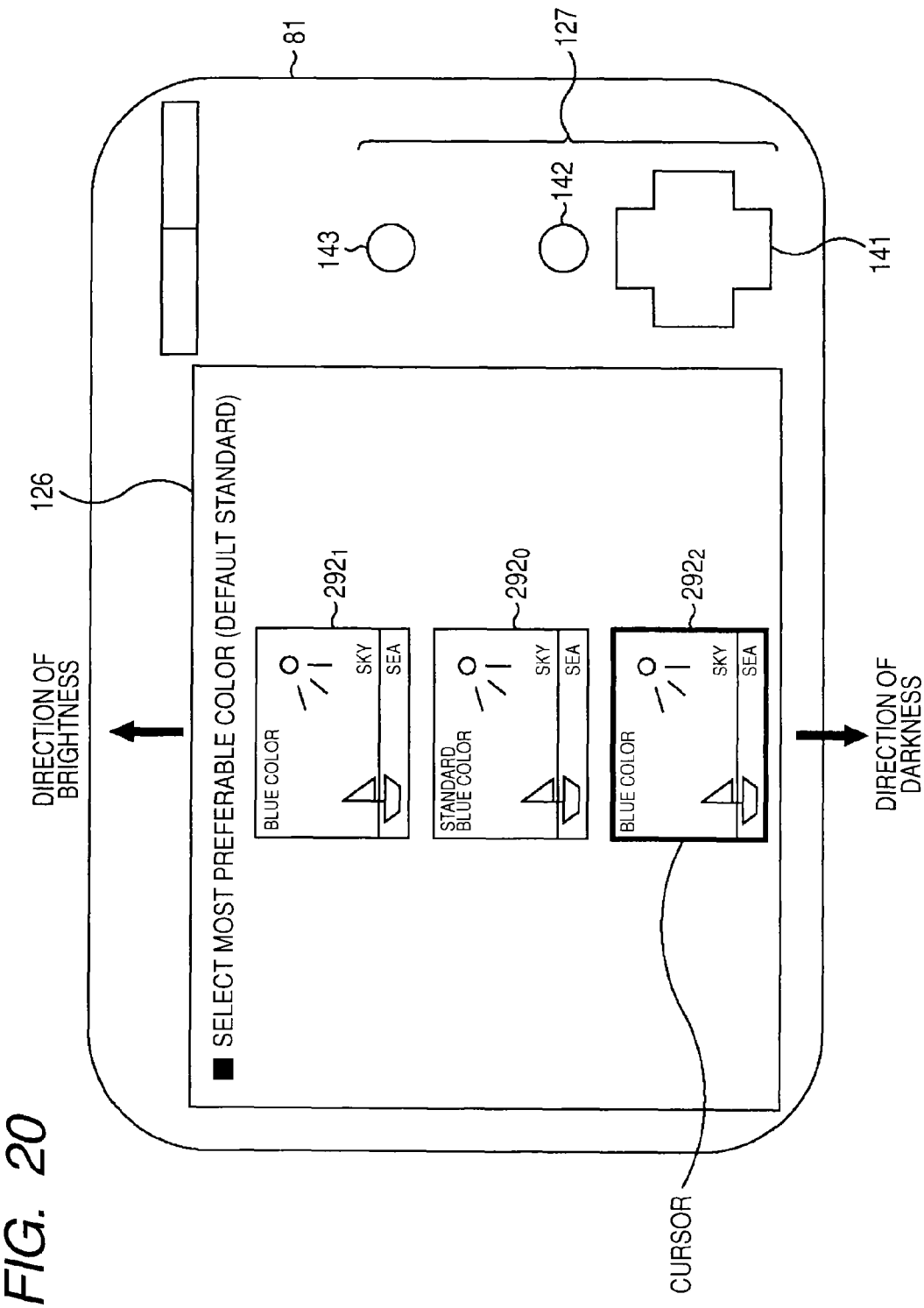
FIG. 20 is a plan view of the digital camera showing the revision data stored in the table storage section, including a plurality of blue images, displayed on the display section, each through with intensity correction by an intensity revised correction value.
Figure 21:
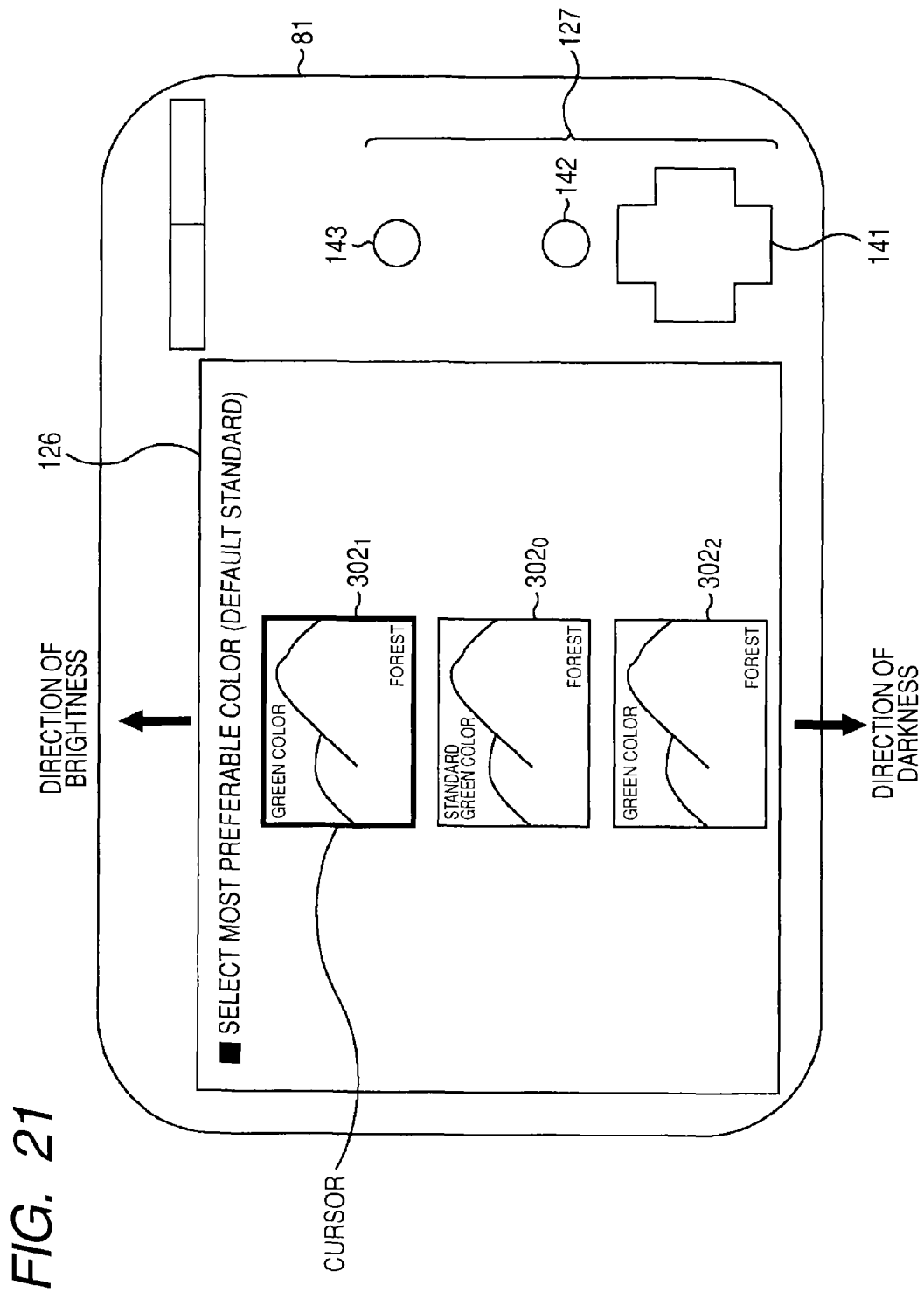
FIG. 21 is a plan view of the digital camera showing the revision data stored in the table storage section, including a plurality of green images, displayed on the display section, each through with intensity correction by an intensity revised correction value.

FIG. 20 is a plan view of the digital camera 81 in which a plurality of blue images found in the revision data are displayed on the display section 126. FIG. 21 is a plan view of the digital camera 81 in which a plurality of green images found in the revision data are displayed on the display section 126.

In FIG. 20, similarly to the skin-color images $282_0$ to $282_2$ of FIG. 19, blue images $292_0$ to $292_2$ varying in brightness are displayed on the display section 126. In FIG. 21, similarly to the skin-color images $282_0$ to $282_2$ of FIG. 19, the green images $302_0$ to $302_2$ varying in brightness are displayed on the display section 126.

Similarly to the above-described case with the skin-color images $282_0$ to $282_2$, when a user selects any of the blue images $292_0$ to $292_2$ displayed on the display section 126, i.e., blue image $292_k$, depending on his or her preferences for brightness, the control section 122 of the digital camera 81 goes through a setting of a revision parameter, i.e., the intensity revision value $y=y_{2k}$ correlated with the selected blue image $292_k$. Also when a user selects any of the green images $302_0$ to $302_2$ displayed on the display section 126, i.e., green image $302_k$, depending on his or her preferences for brightness, the control section 122 of the digital camera 81 goes through a setting of a revision parameter, i.e., the intensity revision value $y=y_{3k}$ correlated with the selected green image $302_k$ (n=0, 1, and 2).

As such, when a revision parameter setting is made for an intensity revision value correlated not only by a user selecting any image with his or her preferred hue but also by the user selecting any image with his or her preferred brightness, in addition to the control over white balance and color correction, the control over brightness can be exercised with ease to meet the user preferences.

In the above example, described is the embodiment in which a setting is made to a revision parameter for use to adjust a captured image in terms of hue and brightness in accordance with the hue and brightness of the image selected by a user. This is surely not restrictive, and in addition to the hue and brightness of a captured image, the chroma of the captured image can be adjusted to make the captured image meet the user preferences.

Considered now is a case where a revision parameter setting is made for use to adjust a captured image to make it meet the user preferences not only for the hue and brightness but also for the chroma. In this case, as alternatives to the white images $272_0$ to $272_2$ of FIG. 17, the display section 126 of the digital camera 81 displays thereon white images $312_0$ to $312_8$ as shown in FIG. 22.

Figure 22:
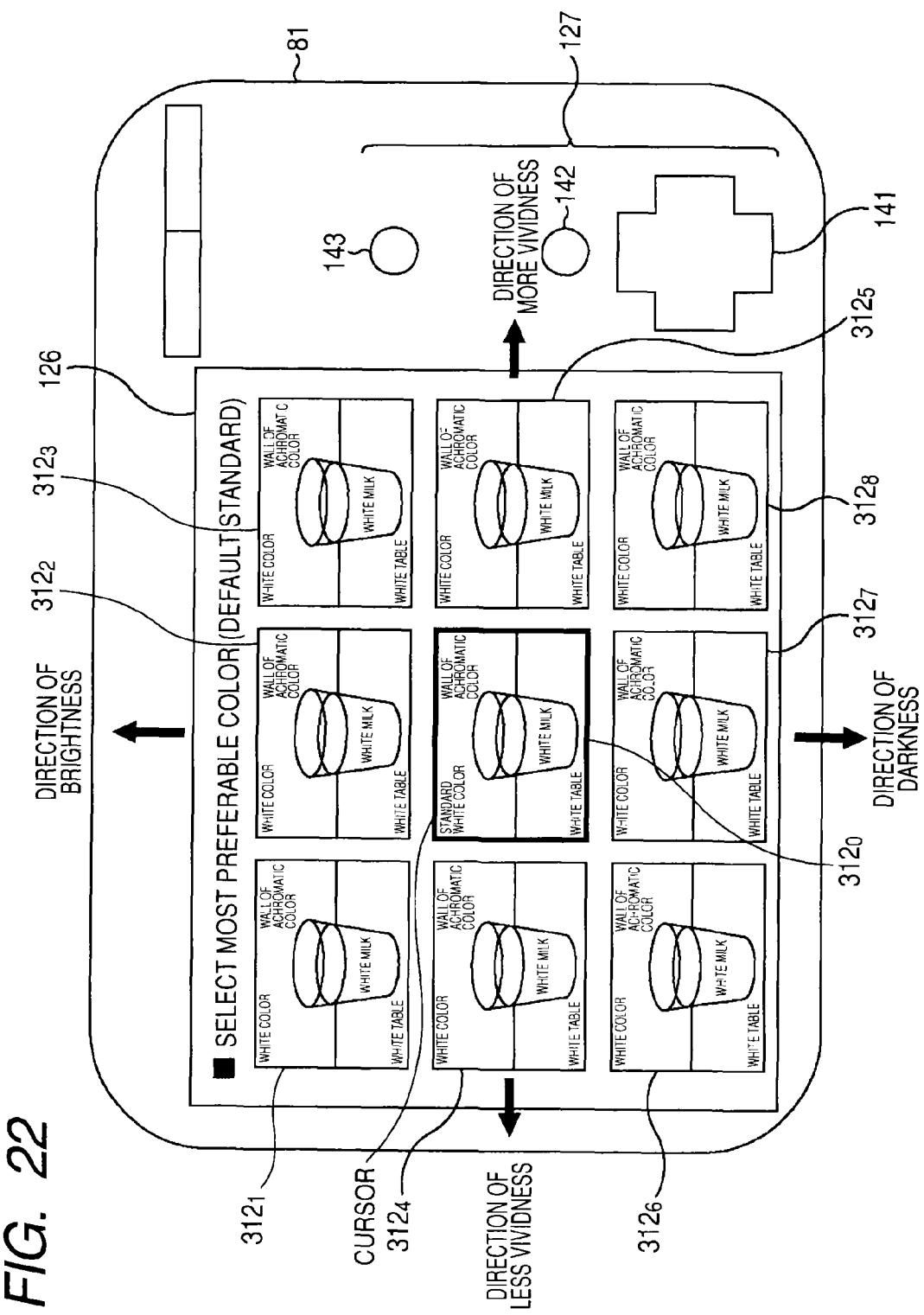
FIG. 22 is a plan view of the digital camera showing the revision data stored in the table storage section, including a plurality of white images varying in lightness and chroma displayed on the display section.

That is, FIG. 22 is a plan view of the digital camera 81 in which the white images $312_0$ to $312_8$ are displayed on the display section 126 when a setting is made for a revision parameter for use to adjust a captured image to make it meet the user preferences not only for the hue and brightness but also for the chroma.

In FIG. 22, the white image $312_0$ is a result of applying intensity correction to a white image using an intensity revised correction value (h+0), and is disposed at the center of the display section 126. Herein, the white image is a result of applying WB correction to an original white image using a WB revised correction value ($g_r+0, g_b+0$). In the drawing, with reference to the white image $312_0$, the white image disposed on the right side thereof looks more vivid, the white image disposed on the left side thereof looks less vivid, the white image disposed thereabove looks brighter, and the white image disposed therebeneath looks darker.

As such, in FIG. 22, the white images $312_3$, $312_5$, and $312_8$ on the right side of the white image $312_0$ look more vivid, and the white images $312_1$, $312_4$, and $312_6$ on the left side thereof look less vivid. The white images $312_1$, $312_2$, and $312_3$ thereabove look brighter, and the white images $312_6$, $312_7$, and $312_8$ therebeneath look darker.

In FIG. 22, in the white images $312_0$ to $312_8$ displayed on the display section 126 with the placement of 3 columns and 3 rows, the white images $312_1$, $312_2$, and $312_3$ on the first row from the top are each a result of the intensity correction applied to an original white image using the same intensity revised correction value (h+$y_{01}$), and then the WB correction to have the chroma levels of $q_0$, $q_1$, and $q_2$ with more vividness in order of the white images $312_1$, $312_2$, and $312_3$.

The white images $312_1$, $312_2$, and $312_3$ are correlated with an intensity revised correction value $y_{01}$ and 3 different chroma levels of $g_0$, $q_1$, and $q_2$, respectively, and are in the revision data and stored in the table storage section 132.

In FIG. 22, in the white images $312_0$ to $312_8$ displayed on the display section 126 with the placement of 3 columns and 3 rows, the white images $312_4$, $312_0$, and $312_5$ on the second row from the top are each a result of the intensity correction applied to the original white image using the same intensity revised correction value $(h+y_{00})=(h+0)$, and then the WB correction to have chroma levels of $q_0$, $q_1$, and $q_2$ with more vividness in order of the white images $312_4$, $312_0$, and $312_5$.

The white images $312_4$, $312_0$, and $312_5$ are correlated with an intensity revised correction value $y_{00}$ and 3 different chroma levels of $q_0$, $q_1$, and $q_2$, respectively, and are in the revision data and stored in the table storage section 132.

In FIG. 22, in the white images $312_0$ to $312_8$ displayed on the display section 126 with the placement of 3 columns and 3 rows, the white images $312_7$, $312_8$, and $312_9$ on the third row from the top are each a result of the intensity correction applied to the original white image using the same intensity revised correction value $(h+y_{02})$, and then the WB correction to have 3 chroma levels of $q_0$, $q_1$, and $q_2$ with more vividness in order of the white images $312_7$, $312_8$, and $312_9$.

The white images $312_7$, $312_8$, and $312_9$ are correlated with an intensity revised correction value $y_{02}$ and 3 different chroma levels of $q_0$, $q_1$, and $q_2$, respectively, and are in the revision data and stored in the table storage section 132.

The table storage section 132 stores therein a table, in the revision data, of correlating the white images $271_0$ to $271_8$ of FIG. 8 to, respectively, 9 different hues $p_0$ to $p_8$ of the white images $271_0$ to $271_8$.

The combination of any one of the 9 hues $p_0$ to $p_8$ and any one of the three chroma levels of $q_0$ to $q_2$, i.e., $(p_i, q_j)$ exists 27 patterns. For each of the 27 patterns of combination of hue and chroma, i.e., $(p_i, q_j)$, the table of correlation with a potential parameter being a WB revision value $(a', b')_{ij}$ is included in the revision data for storage in the table storage section 132 (i=0, 1, . . . , 7, and 8/j=0, 1, and 2).

Note that the WB revision value $(a', b')_{ij}$ correlated with a combination of a specific hue $p_i$ and a specific chroma $q_j$ is used for revision of a WB standard value $(g_r, g_b)$ for deriving a WB revised correction value $(g_r+a', g_b+b')$, for the hue $P_i$ and the chroma level $q_j$, of applying WB correction to the white color in the captured image (i=0, 1, . . . , 7, and 8/j=0, 1, and 2).

At the time of initial setting of the digital camera 81, the white images $271_0$ to $271_8$ of FIG. 8 stored in the table storage section 132 are displayed on the display section 126, and the white images $312_0$ to $312_8$ of FIG. 22 stored in the table storage section 132 are displayed on the display section 126.

When the user selects any preferred one of the white images $271_0$ to $271_8$ displayed on the display section 126, e.g., white image $271_n$, and then when the user selects any preferred one of the white images $312_0$ to $312_8$ displayed on the display section 126, e.g., white image $312_m$, the control section 122 of the digital camera 81 sets a WB revision value $(a', b')_{ij}$ as a revision parameter. The WB revision value $(a', b')_{ij}$ is being correlated with the combination $(p_i, q_j)$ of the hue correlated with the selected white image $271_n$ and the chroma correlated with the white image $312_m$ (n=0, 1, . . . , 7, and 8/m=0, 1, and 2).

The similar configuration is also applicable to skin-color images.

That is, the table storage section 132 stores therein a table of correlating the skin-color images $281_0$ to $281_8$ of FIG. 10 with, respectively, 9 different hues of the skin-color images $281_0$ to $281_8$. Similarly to the case with the white images $312_1$ to $312_8$ of FIG. 22, the table storage section 132 stores therein a table of correlating a plurality of skin-color images with, respectively, 3 different chroma levels of the skin-color images.

The combination of any one of the 9 hues and any one of the three chroma levels exists 27 patterns. For each of the 27 patterns of combination of hue and chroma, a potential parameter being a color-correction matrix revision value [c', d', e', f'] is correlated, and the correlation results are included in the revision data for storage in the table storage section 132. The color-correction matrix revision value [c', d', e', f] correlated with the combination of a specific hue and a specific chroma level is used for revision of a color-correction matrix standard value [GainB, HueR, HueB, GainR] for deriving a color-correction matrix revised correction value [GainB+c', HueR+d', HueB+e', GainR+f'], for the hue and chroma, of applying color correction to derive, a predetermined color in the captured image.

At the time of initial setting of the digital camera 81, the skin-color images $281_0$ to $281_8$ of FIG. 10 stored in the table storage section 132 are displayed on the display section 126, and the white images $312_0$ to $312_8$ of FIG. 22 stored in the table storage section 132 are displayed on the display section 126.

When the user selects any preferred one of the skin-color images $281_0$ to $281_8$ displayed on the display section 126, e.g., skin-color image $281_n$, and then when the user selects any preferred one of the skin-color images displayed on the display section 126 similarly to the white mages $312_0$ to $312_8$, the control section 122 of the digital camera 81 sets a color-correction matrix revision value [c', d', e', f'] as a revision parameter. The color-correction matrix revision value [c', d', e', f'] is being correlated with the combination of the hue of the selected skin-color image $281_n$ and the chroma level of the skin-color image selected from those others similarly to the white images $312_0$ to $312_8$ of FIG. 22. Note that the similar configuration is also applicable to blue images and green images.

The concern here is that the user-preferred colors in images may be changed due to the current user taste change and the passage of time. If this is the case, users may not always find their preferred image among a plurality of images in the revision data stored in the table storage section 132.

In consideration thereof, it is preferable if the revision data is updatable as appropriate.

Figure 23:
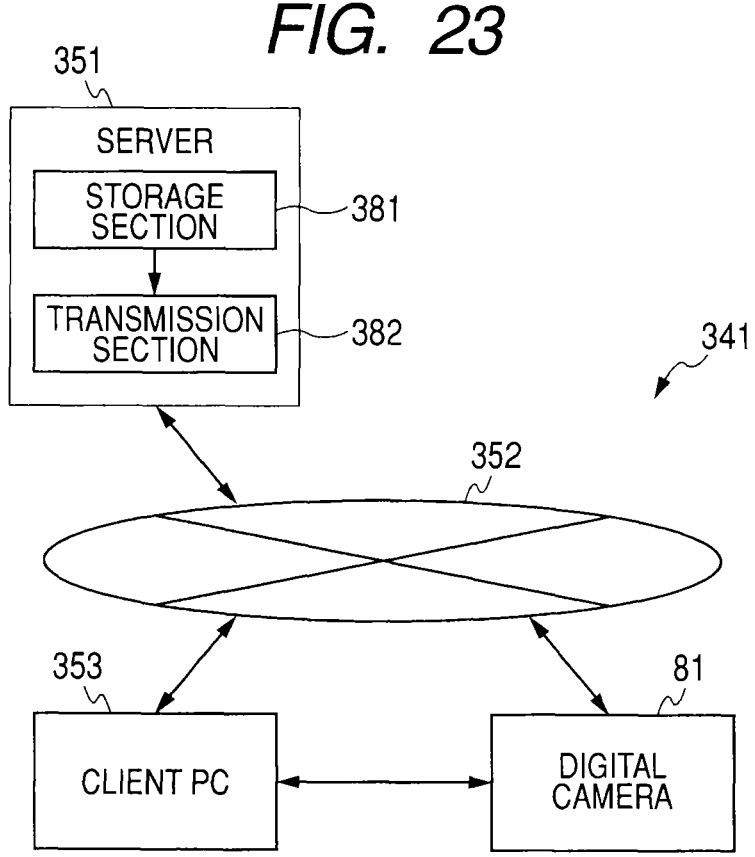
FIG. 23 is a block diagram showing a data update processing system to which the invention is applied.

FIG. 23 is a block diagram showing an exemplary configuration of a data update processing system 341 for updating revision data stored in the digital camera 81.

The data update processing system 341 is configured to include: the digital camera 81 of FIG. 3, a server 351, a network 352, and a client PC (Personal Computer) 353.

The digital camera 81 receives, by the internally-provided reception section 151, the revision data coming over the network 352 or from the client PC 353. The reception section 151 of the digital camera 81 supplies the received data to the table storage section 132 of the digital camera 81 for storage therein.

The digital camera 81 issues, by the internally-provided transmission section 152, a transmission request to the server 351 for the revision data. In response thereto, the revision data is forwarded to the reception section 151 of the digital camera 81 from the server 351.

The digital camera 81 also reads, by the internally-provided transmission section 152, the revision data stored in the table storage section 132. Thus read revision data is forwarded to the client PC 353 via an interface such as USB (Universal Serial Bus) or over the network 352.

The server 351 is configured to include a storage section 381 and a transmission section 382. The storage section 381 of the server 351 stores therein the revision data. Herein, the revision data stored in the storage section 381 of the server 351 includes, for example, images of current popular color and brightness, and potential parameters correlated with the images.

The transmission section 382 of the server 351 reads the revision data stored in the storage section 381 of the server 351, and forwards the data over the network 352 to the client PC 353 or the digital camera 81.

From the transmission section 382 of the server 351, the client PC 353 receives, for storage, the revision data coming over the network 352, or the revision data coming from the digital camera 81 over the network 352 or via the interface such as USB. The client PC 353 supplies the revision data in storage to the digital camera 81 via the interface such as USB.

Figure 24:
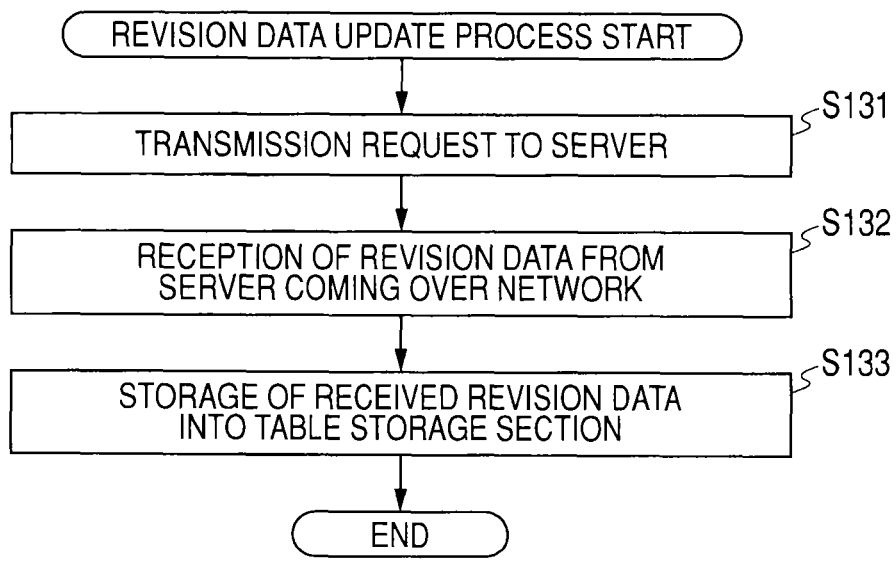
FIG. 24 is a flowchart for illustrating an update process in the data update processing system to which the invention is applied.

By referring to the flowchart of FIG. 24, described next is a data update process of updating the revision data stored in the digital camera 81.

This process is started when a user operates the operation section 127 to update the revision data, for example.

In step S131, the transmission section 152 (the communications section 120) of the digital camera 81 (FIG. 3) transmits a transmission request to the server 351 for the revision data over the network 352. The server 351 receives the transmission request coming from the digital camera 81. In the server 351, in response to the transmission request from the digital camera 81, the transmission section 382 reads the revision data from the storage section 381 of the server 351. Thus read revision data is forwarded to the digital camera 81 over the network 352.

The procedure then goes from step S131 to S132, and in step S132, the reception section 151 of the digital camera 81 receives the revision data from the transmission section 382 of the server 351 over the network 352. The procedure then goes to step S133.

In step S133, the reception section 151 of the digital camera 81 supplies the received revision data to the table storage section 132 of the digital camera 81 for storage therein. This is the end of the process.

In such a digital camera 81, the revision data can be stored in the table storage section 132 through reception of the revision data from the server 351 so that the revision data stored in the table storage section 132 can be updated.

This favorably leads to image processing appropriately reflecting the user preferences even if images preferred by users are changed over the passage of time.

To update the revision data stored in the table storage section 132, alternatively, the revision data may be downloaded from the server 351 to the client PC 353, and the data may be transferred from the client PC 353 to the digital camera 81.

The series of processes taken charge by the control section 122 and the image processing section 123 of FIG. 3 may be executed by any specific hardware or by software. When the series of processes is to be executed by software, a program configuring the software is installed from a program storage medium to a so-called built-in computer, a general-purpose personal computer capable of various types of functions with various types of programs installed therein, or others.

Figure 25:
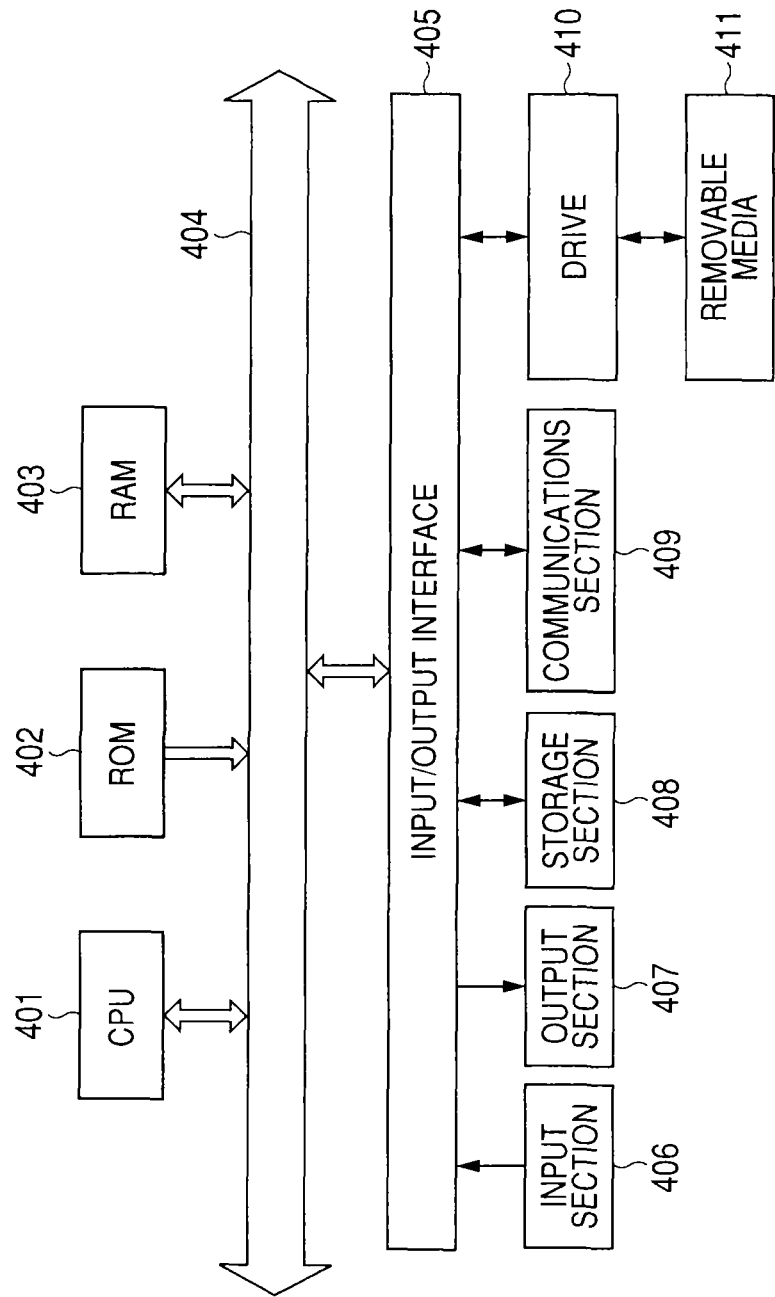
FIG. 25 is a block diagram showing an exemplary configuration of a personal computer.

FIG. 25 is a block diagram showing an exemplary configuration of a personal computer executing the above-described series of processes by a program.

A CPU (Central Processing Unit) 401 goes through various types of processes by following a program stored in a ROM (Read Only Memory) 402 or a storage section 408. A RAM (Random Access Memory) 403 stores therein programs and data for execution by the CPU 401 as appropriate.

These components, i.e., the CPU 401, the ROM 402, and the RAM 403, are connected together over a bus 404.

The CPU 401 is connected with an input/output interface 405 via the bus 404. The input/output interface 405 is connected with an input section 406 and an output section 407. The input section 406 is configured to include a keyboard, a mouse, a microphone, and others, and the output section 407 is configured to include a display, a speaker, and others. The CPU 401 executes various types of processes in response to a command coming from the input section 406. The CPU 401 then outputs the process results to the output section 407.

A storage section 408 connected to the input/output interface 405 is exemplified by a hard disk, and stores therein programs to be executed by the CPU 401 and various types of data. A communications section 409 establishes a communications link with any external device over a network such as the Internet and local area network.

Alternatively, program acquisition may be performed via the communications section 409, and thus acquired programs may be stored in the storage section 408.

A drive 410 connected to the input/output interface 405 drives a removable medium 411 when it is attached, and acquires programs, data, and others recorded thereon. The removable medium 411 is exemplified by a magnetic disk, an optical disk, a magneto-optical disk, a semiconductor memory, or others. Thus acquired programs and data are transferred to the storage section 408 if required, and then stored.

A program storage medium is installed in a computer for use to store a program to be ready for execution by the computer. As shown in FIG. 25, such a program storage medium is configured by the removable medium 411, the ROM 402, a hard disk configuring the storage section 408, or others. The removable medium 411 is a package medium including a magnetic disk (including flexible disk), an optical disk (including CD-ROM (Compact Disc-Read Only Memory), DVD (Digital Versatile Disc)), a magneto-optical disk (including MD (Mini-Disc)), a semiconductor memory, or others. The ROM 402 stores therein a program (s) temporarily or permanently. The program storage to such a program storage medium is made, as appropriate, via the communications section 409 being an interface such as router or modem by utilizing a communications medium via a cable or by radio such as local area network, the Internet, and digital satellite broadcasting.

In this specification, the step description for a program stored in a program storage medium includes not only time-series processes to be executed in the described order but also processes to be executed not necessarily in a time series manner but in a parallel manner or separately.

Also in this specification, the system means an apparatus in its entirely configured by a plurality of devices.

In the embodiment, images displayed on the display section 126 for user selection are exemplified by four types of white images, skin-color images, blue images, and green images. Alternatively, images of any other predominant color, e.g., yellow images of yellow-based, may be added, or the number of types may be reduced for the images so that the arbitrary number of images can be used.

Further, in the embodiment, the wall in a white image is exemplified as being of achromatic color. This is surely not restrictive, and the wall of achromatic color may be white, for example.

The intensity correction section 244 of FIG. 15 revises an intensity standard value h using an intensity revision value y selected based on a correlated color provided by the signal conversion section 233. Alternatively, an average value may be calculated for the intensity revision values y respectively revised with the images, e.g., white images, skin-color images, blue images, and green images, and using the resulting average value, the intensity standard value h may be revised.

Still further, in this embodiment, a revised correction value is calculated through addition of a standard value and a revision parameter. Alternatively, the revised correction value may be calculated by multiplying a standard value and a revision parameter. With this being the case, a potential parameter correlated with each of a plurality of images in the revision data stored in the table storage section 132 takes each different value depending on the calculation method of the revised correction value.

When the digital camera 81 has a shooting mode of scene select shooting, a revision parameter can be determined in advance for every possible mode in the scene select shooting mode. With the scene select shooting mode, various types of settings such as white balance and color correction are made in advance depending on an object for shooting, the environment for shooting, and others. To be specific, in the scene select shooting mode, when a portrait mode suited for mainly shooting a person is selected for use, for example, irrespective of the correlated color, for every color-difference signals (B−Y) and (R−Y), a color-correction matrix revision value of a revision parameter correlated with every skin-color image can be used.

Still further, for the image processing to be executed in the image processing section 123 of FIG. 3, possible options include the color-reproduction matrix technique of Patent Document 1, the color convergence technique of Patent Document 2, or the image processing using the stored color correction WB technique of Patent 3, for example. With this being the case, there needs to make the table storage section 132 to store therein any appropriate revision data for such techniques, i.e., the color-reproduction matrix technique, the color convergence technique, or the image processing using the stored color correction WB technique.

Moreover, in the embodiment, exemplified is the digital camera to which the invention is applied. This is surely not restrictive, and the invention can be applied to personal computers, television receivers, and others that can correct the color and brightness of images.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
circuitry configured to
control to display a plurality of predominant color images simultaneously, the plurality of predominant color images being based on a single predominant color, and each of the plurality of predominant color images having a different color and being associated with a different revision parameter;
set a revision parameter, read from a revision table, corresponding to a user selected one of the predominant color images;
determine a standard correction value based on a color temperature of the user selected one of the predominant color images;
revise the standard correction value based on the revision parameter; and
correct an input image according to the revised standard correction value,
wherein
the circuitry controls to display the plurality of predominant color images in an ordered grid such that
an image at a center of the grid has a standard color scheme,
images in a first direction from the center of the grid increase in a first color intensity proportionally to a corresponding distance to the center of the grid, and
images in a second direction from the center of the grid, the second direction opposite of the first direction, increase in a second color intensity proportionally to a corresponding distance to the center of the grid.

2. The image processing apparatus according to claim 1, further comprising:
a memory configured to store the plurality of predominant color images and the revision parameters thereof.

3. The image processing apparatus according to claim 2, further comprising:
a network interface configured to communicate with an external device, wherein
the memory stores the plurality of predominant color images and the revision parameters thereof received by the network interface.

4. The image processing apparatus according to claim 1, wherein each of the plurality of predominant color images includes a subject associated with the predominant color.

5. The image processing apparatus according to claim 1, wherein the circuitry is further configured to correct the input image using at least one of white balance correction, color reproduction correction and intensity correction.

6. The image processing apparatus according to claim 2, wherein the image processing apparatus is an image capturing device.

7. The image processing apparatus according to claim 6, wherein each of the predominant images stored in the memory and displayed on the display are images that were not captured by the image capturing device.

8. The image processing apparatus according to claim 1, wherein the circuitry is further configured to calculate the color temperature of the one of the predominant color images that is selected by the user.

9. The image processing apparatus according to claim 1, wherein the circuitry is further configured to receive an input from the user, the input indicating a selection of the one of the predominant color images.

10. The image processing apparatus according to claim 1, wherein
the single predominant color is a first color, and
the circuitry is further configured to
control to display a second plurality of predominant color images simultaneously, the second plurality of predominant color images being based on a second predominant color different from the first color, and each of the plurality of second predominant color images having a different color and being associated with a different revision parameter;
set a second revision parameter, read from the revision table, corresponding to a second user selected one of the second predominant color images;
determine a second standard correction value based on a second color temperature of the second user selected one of the second predominant color images;
revise the second standard correction value based on the second revision parameter; and correct the input image according to the revised second standard correction value.

11. The image processing apparatus according to claim 1, wherein
images in the first direction from the center of the grid are to the left of the center of the grid, and
images in the second direction from the center of the grid are to the right of the center of the grid.

12. The image processing apparatus according to claim 1, wherein
images in the first direction from the center of the grid are above the center of the grid, and
images in the second direction from the center of the grid are below the center of the grid.

13. An image processing method, comprising:
controlling to display a plurality of predominant color images simultaneously, the plurality of predominant color images being based on a single predominant color, and each of the plurality of predominant color images having a different color and being associated with a different revision parameter;
setting, by circuitry, a revision parameter, read from a revision table, corresponding to a user selected one of the predominant color images;
determining, by the circuitry, a standard correction value based on a color temperature of the user selected one of the predominant color images;
revising the standard correction value based on the revision parameter; and
correcting an input image according to the revised standard correction value, wherein
the controlling to display the plurality of predominant color images in an ordered grid is performed such that an image at a center of the grid has a standard color scheme,
images in a first direction from the center of the grid increase in a first color intensity proportionally to a corresponding distance to the center of the grid, and
images in a second direction from the center of the grid, the second direction opposite of the first direction, increase in a second color intensity proportionally to a corresponding distance to the center of the grid.

14. The image processing method according to claim 13, further comprising:
storing the plurality of predominant color images and the revision parameters received through a network interface.

15. The image processing method according to claim 13, wherein each of the plurality of predominant color images includes a subject associated with the predominant color.

16. The image processing method according to claim 13, wherein the correcting includes correcting the input image using at least one of white balance correction, color reproduction correction and intensity correction.

17. The image processing method according to claim 13, further comprising:
calculating the color temperature of the one of the predominant color images that is selected by the user.

18. The image processing method according to claim 13, wherein
images in the first direction from the center of the grid are to the left of the center of the grid, and
images in the second direction from the center of the grid are to the right of the center of the grid.

19. The image processing method according to claim 13, wherein
images in the first direction from the center of the grid are above the center of the grid, and
images in the second direction from the center of the grid are below the center of the grid.

20. A non-transitory computer-readable medium storing computer readable instructions that, when executed by circuitry of an image processing apparatus, cause the image processing apparatus to perform a method of image correction, the method comprising:
controlling to display a plurality of predominant color images simultaneously, the plurality of predominant color images being based on a single predominant color, and each of the plurality of predominant color images having a different color and being associated with a different revision parameter;
setting a revision parameter, read from a revision table, corresponding to a user selected one of the predominant color images;
determining a standard correction value based on a color temperature of the user selected one of the predominant color images;
revising the standard correction value based on the revision parameter; and
correcting an input image according to the revised standard correction value wherein
the controlling to display the plurality of predominant color images in an ordered grid is performed such that an image at a center of the grid has a standard color scheme,
images in a first direction from the center of the grid increase in a first color intensity proportionally to a corresponding distance to the center of the grid, and
images in a second direction from the center of the grid, the second direction opposite of the first direction, increase in a second color intensity proportionally to a corresponding distance to the center of the grid.

21. The non-transitory computer-readable medium according to claim 20, wherein the method further comprises:
storing the plurality of predominant color images and the revision parameters received through a network interface.

22. The non-transitory computer-readable medium according to claim 20, wherein each of the plurality of predominant color images includes a subject associated with the predominant color.

23. The non-transitory computer-readable medium according to claim 20, wherein the correcting includes correcting the input image using at least one of white balance correction, color reproduction correction and intensity correction.

24. The non-transitory computer-readable medium according to claim 20, wherein
images in the first direction from the center of the grid are to the left of the center of the grid, and
images in the second direction from the center of the grid are to the right of the center of the grid.

25. The non-transitory computer-readable medium according to claim 20, wherein
images in the first direction from the center of the grid are above the center of the grid, and
images in the second direction from the center of the grid are below the center of the grid.

* * * * *